(12) United States Patent
Simmonds et al.

(10) Patent No.: US 12,118,675 B1
(45) Date of Patent: Oct. 15, 2024

(54) AUGMENTED REALITY SYSTEM

(71) Applicant: Apple Inc., Cupertino, CA (US)

(72) Inventors: Michael D. Simmonds, Ashford (GB); James H. Foster, London (GB); James E. Pedder, Thame (GB); Richard J. Topliss, Cambridge (GB); Thomas M. Gregory, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 17/240,447

(22) Filed: Apr. 26, 2021

Related U.S. Application Data

(60) Provisional application No. 63/016,196, filed on Apr. 27, 2020.

(51) Int. Cl.
*G06T 19/00* (2011.01)
*G03B 21/20* (2006.01)
*H04N 9/31* (2006.01)

(52) U.S. Cl.
CPC ........ *G06T 19/006* (2013.01); *G03B 21/2033* (2013.01); *H04N 9/3144* (2013.01); *H04N 9/3147* (2013.01)

(58) Field of Classification Search
CPC  G06T 19/006; G03B 21/2033; H04N 9/3144; H04N 9/3147
See application file for complete search history.

(56) References Cited

U.S. PATENT DOCUMENTS

| | | |
|---|---|---|
| 7,300,179 B1 | 11/2007 | LaDuke et al. |
| 8,317,331 B2 | 11/2012 | Li |
| 8,736,675 B1 | 5/2014 | Holzbach |
| 8,879,782 B2 | 11/2014 | Garlington et al. |
| 9,134,593 B1 | 9/2015 | Worley, III |
| 9,239,627 B2 | 1/2016 | Kryze et al. |
| 9,261,762 B2 | 2/2016 | Kim |
| 10,004,984 B2 | 6/2018 | Voris et al. |
| 10,297,082 B2 | 5/2019 | Wilson et al. |
| 10,388,641 B2 | 8/2019 | Martin |

(Continued)

OTHER PUBLICATIONS

U.S. Appl. No. 63/058,240, filed Feb. 5, 2021, Felipe Bacim de Araujo e Silva, et al.

(Continued)

*Primary Examiner* — Michelle Chin
(74) *Attorney, Agent, or Firm* — Robert C. Kowert; Kowert, Hood, Munyon, Rankin & Goetzel, P.C.

(57) ABSTRACT

A light system that may project virtual content onto surfaces of a room. The system may include one or more low-resolution light-emitting diode (LED) projectors for emitting light representing low-resolution virtual content, and a high-resolution LED projector for emitting light representing high-resolution virtual content. The high-resolution projector may be used to project a 2D image of augmented or virtual reality content being viewed by a person in a room using a device such as a headset or glasses onto a surface of the room so that other persons in the room can view a representation of what the person using the device is seeing. The low-resolution projector(s) may project low-resolution images onto other surfaces in the room, for example the walls and ceiling. The system may also be configured to emit diffuse light to illuminate a room when not emitting light representing virtual content.

20 Claims, 21 Drawing Sheets

(56) References Cited

U.S. PATENT DOCUMENTS

| | | |
|---|---|---|
| 10,921,878 B2 | 2/2021 | Noris et al. |
| 2007/0092189 A1 | 4/2007 | Morejon |
| 2008/0278791 A1* | 11/2008 | De Vaan ............ G02F 1/133504 |
| | | 348/E5.136 |
| 2009/0051831 A1 | 2/2009 | Bierhuizen |
| 2010/0309390 A1 | 12/2010 | Plut |
| 2013/0342813 A1 | 12/2013 | Wang |
| 2014/0160442 A1 | 6/2014 | Lee |
| 2014/0185285 A1 | 7/2014 | Jorgensen |
| 2016/0109102 A1 | 4/2016 | Kim |
| 2016/0150201 A1* | 5/2016 | Kilcher ................ G02B 26/105 |
| | | 348/745 |
| 2017/0334341 A1* | 11/2017 | Kurashige .............. B60Q 1/549 |
| 2018/0129167 A1* | 5/2018 | Maimone ............. G03H 1/2645 |
| 2019/0212642 A1 | 7/2019 | McMillan |
| 2019/0369298 A1 | 12/2019 | Ja |
| 2020/0081492 A1* | 3/2020 | Wang .................... G06F 1/1647 |
| 2020/0088358 A1* | 3/2020 | Minor ....................... F21K 9/60 |
| 2020/0236759 A1 | 7/2020 | Jurik |

OTHER PUBLICATIONS

U.S. Appl. No. 17/665,331, filed Feb. 4, 2022, Felipe Bacim de Araujo e Silva, et al.
U.S. Appl. No. 17/935,010, filed Sep. 23, 2022, Felipe Bacim de Araujo e Silva, et al. \.

* cited by examiner

AUGMENTED REALITY SYSTEM

This application claims benefit of priority to U.S. Provisional Application Ser. No. 63/016,196, entitled "AUGMENTED REALITY SYSTEM", filed Apr. 27, 2020, which is hereby incorporated by reference herein its entirety.

BACKGROUND

Light emitting diodes (LEDs) are used in a variety of applications. LEDs can be produced that emit light in a variety of colors and wavelengths, including light in the visible and infrared (IR) portions of the spectrum.

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) or augmented reality (AR) systems combine computer generated information (referred to as virtual content) with real world images or a real world view to augment, or add content to, a user's view of the world. The simulated environments of VR and/or the mixed environments of MR may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Various embodiments of methods and apparatus for emitting light including light representing augmented reality (AR) content into environments such as rooms are described. Embodiments of an AR light system are described that may be used to project AR content onto one or more surfaces of a room. In some embodiments, an AR light system may include one or more low-resolution light-emitting diode (LED) projectors for emitting light including light representing low-resolution AR content, and one or more high-resolution LED projectors for emitting light including light representing high-resolution AR content. In some embodiments, an AR light system may also be configured to emit diffuse light to illuminate a room when not emitting light representing AR content. In some embodiments, the high-resolution LED projector of an AR light system may be used to project a 2D image of AR or virtual reality (VR) content being viewed by a person in a room using an AR/VR system (e.g., an AR/VR headset or glasses) onto a surface (e.g., a table, or the floor) of the room so that other persons in the room can view what the person using the AR/VR system is seeing. In some embodiments, the low-resolution LED projector(s) may project low-resolution images onto other surfaces in the room, for example at least portions of the walls, ceiling, and floors.

In some embodiments, an AR light system may include a single high-resolution LED projector surrounded by multiple low-resolution LED projectors. In some embodiments, an AR light system may include a single low-resolution LED projector with a wide-angle or "fisheye" lens to disperse low-resolution AR content or diffuse light and a single high-resolution LED projector with a narrow-angle focusing lens for projecting high-resolution AR content. In some embodiments, an AR light system may include a single "foveated" LED projector that includes a foveated LED array and a wide-angle lens that projects both high-resolution and low-resolution AR content. In some embodiments, the high-resolution LED projector may include an actuator to move the projector so that the high-resolution AR content can be directed to different locations or surfaces within a room. In some embodiments, one or more of the low-resolution LED projectors may instead or also include actuators to move the projectors.

Embodiments of a low-resolution LED projector are described that include an active matrix low-resolution LED array and a focusing lens. The low-resolution LED array may, for example, be a 64×64 array of individually addressable LEDs. However, in some embodiments, the low-resolution LED array may be smaller or larger, for example a 16×16, 32×32, 128×128, or 256×256 array. Also note that the low-resolution LED array is not necessarily a square array.

Embodiments of a high-resolution LED projector are described that include an active matrix high-resolution LED array and a focusing lens. The LED array may, for example, be a 1024×1024 array of individually addressable LEDs. However, in some embodiments, the high-resolution LED array may be larger or smaller, for example a 512×512 or 2 k×2 k array. In some embodiments, resolution (number of LEDs) of the high-resolution LED array may be a standard resolution format, for example 1024×768 or 1920×1080.

In some embodiments, the low-resolution and high-resolution LED projectors may include switchable diffusers to diffuse light emitted by the LED arrays when using the AR light system for room illumination. In some embodiments, the switchable diffusers may also be used to project image content (e.g., icons or signals) onto the surface of the AR light system's transparent or semi-transparent enclosure.

In some embodiments, components of an AR light system including but not limited to the low-resolution LED projector(s) and the high-resolution LED projector may be packaged or contained within an enclosure or "bulb-like" structure of a transparent or semi-transparent material (e.g., glass or plastic). In some embodiments, the AR light system may be connected to electrical power, for example via a conventional light socket or via a conventional power plug. Embodiments of AR light systems as described herein, may, for example, be hung from a ceiling, or mounted on floor or table stands.

In some embodiments, an AR light system may include a passive heat dissipation mechanism that may include passive heat sinks on the LED arrays and cooling air vents near the bottom and top of the enclosure that allow passive air flow through the enclosure.

In some embodiments, an AR light system may include a controller or control system that may, for example, provide power and video signals to the low- and high-resolution LED projectors.

In some embodiments, an AR light system may also include wireless technology that enables wireless communications between the system and other devices, such as an AR/VR system (e.g., an AR/VR headset or glasses) or a mobile multipurpose device such as a smartphone, pad or tablet device. In some embodiments, an AR light system may instead or also include technology that enables wired connection between the system and other devices.

In some embodiments, the low- and high-resolution LED projectors may include integrated optical detection systems to detect objects and surfaces (e.g., people and specular surfaces such as mirrors or windows) within a room. The optical detection systems may also determine depth of objects or surfaces within a room. In some embodiments, the optical detection systems may use infrared (IR) light to detect objects or surfaces. Information about objects and surfaces within a room collected by the optical detection systems may be fed back to the controller, which may use the information in controlling operation of the LED projectors.

Embodiments of high- and low-resolution LED arrays that may be used in the AR light systems are also described. LED arrays that include low-doped Europium to provide color temperature adjustment are described. In addition, LED arrays that include integrated LED reflectors to increase brightness are described.

Figure 1A:
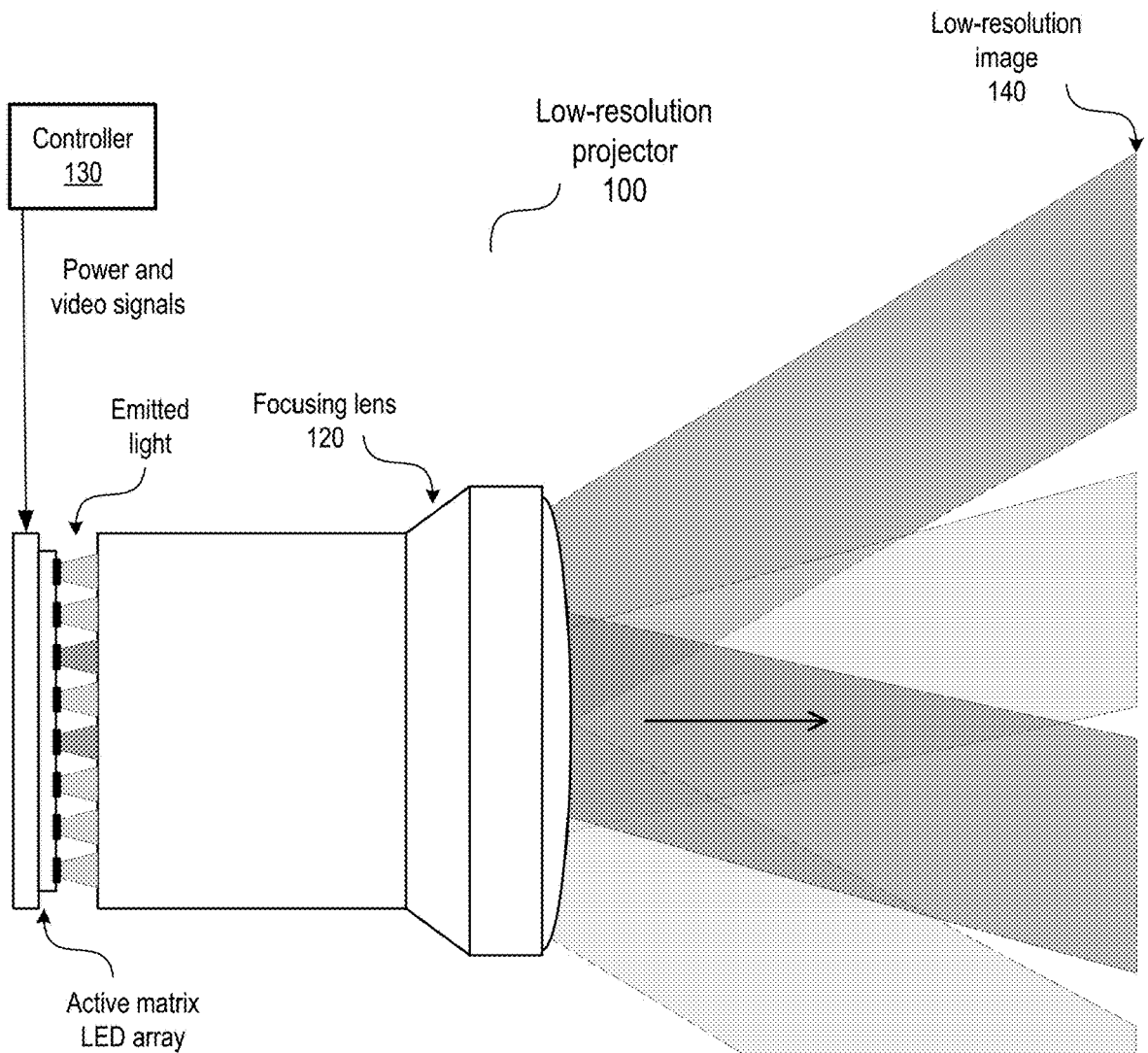
FIGS. 1A through 1C illustrate a low-resolution light-emitting diode (LED) projector for emitting light including light representing augmented reality (AR) content, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for emitting light including light representing augmented reality (AR) content into environments such as rooms are described. Embodiments of an AR light system are described that may be used to project AR content onto one or more surfaces of a room. In some embodiments, an AR light system may include one or more low-resolution light-emitting diode (LED) projectors for emitting light including light representing low-resolution AR content, and one or more high-resolution LED projectors for emitting light including light representing high-resolution AR content.

Conventional augmented and virtual reality systems deliver the augmented or virtual display content via specially designed eyewear (referred to herein as head-mounted displays, or HMDs) that the user must wear in order to view the content. Typically, these HMDs tend to be large, heavy, hot, and require large batteries. Some people may not be comfortable wearing an HMD. In addition, persons in a room with another person wearing an HMD may want to view at least some of the virtual or augmented content that is being viewed. Embodiments of the AR light system as described herein may circumnavigate the need for an HMD when viewing AR or VR content within the confines of a room. Embodiments of the AR light system may provide both room illumination, as per conventional room lighting (e.g., light fixtures or light bulbs), as well as projecting both high and low resolution AR and VR imagery onto surfaces in the room. The imagery may, for example, be projected onto the floor, walls, and ceiling of a room. However, the AR light system may also intelligently augment particular objects found within the room.

In some embodiments, the high resolution part of the imagery may be projected primarily to the floor (or surfaces such as tables) and walls of the room, while the low resolution part of the imagery may be projected primarily to the walls and ceiling of the room. The high-resolution part of the imagery may, for example, contain a user interface of an operating system, high resolution video, games, video conferencing images, or in general any type of high-resolution content. The low-resolution part of the imagery may, for example, contain simple mood enhancing content such as swaying shadows of trees and leaves or clouds, or content such as images of cats, birds, fish, and so on. The low- and high-resolution imagery may also provide general room lighting, as per ordinary existing light fixtures.

A goal is to provide the low resolution part of the AR light system with simple, low cost hardware. Embodiments of a low-resolution LED projector for AR light systems are described that include a relatively simple, active matrix low-resolution LED array and a focusing lens. The focusing lens may be a relatively simple, low-cost lens, and is not required to be an optically "perfect" lens. The low-resolution LED array may, for example, be a 64×64 array of individually addressable LEDs. However, in some embodiments, the low-resolution LED array may be smaller or larger, for example a 32×32, 128×128, or 256×256 array. Also note that the low-resolution LED array is not necessarily a square array.

Embodiments of a high-resolution LED projector for AR light systems are also described that include an active matrix high-resolution LED array and a focusing lens. The LED array may, for example, be a 1024×1024 array of individually addressable LEDs. However, in some embodiments, the high-resolution LED array may be larger or smaller, for example a 512×512 or 2 k×2 k array. In some embodiments, resolution (number of LEDs) of the high-resolution LED array may be a standard resolution format, for example 1024×768 or 1920×1080.

In some embodiments, an AR light system may include a single high-resolution LED projector surrounded by multiple low-resolution LED projectors. In some embodiments, an AR light system may include a single low-resolution LED projector with a wide-angle or "fisheye" lens to disperse low-resolution AR content or diffuse light and a single high-resolution LED projector with a narrow-angle focusing lens for projecting high-resolution AR content. In some embodiments, an AR light system may include a single "foveated" LED projector that includes a foveated LED array and a wide-angle lens that projects both high-resolution and low-resolution AR content. In some embodiments, the high-resolution LED projector may include an actuator to move the projector so that the high-resolution AR content can be directed to different locations or surfaces within a room. In some embodiments, one or more of the low-resolution LED projectors may instead or also include actuators to move the projectors.

In some embodiments, the high-resolution LED projector of an AR light system may be used to project a 2D image of AR or virtual reality (VR) content being viewed by a person in a room using an AR/VR system (e.g., an AR/VR headset or glasses) onto a surface (e.g., a table, or the floor) of the room so that other persons in the room can view what the person using the AR/VR system is seeing. In some embodiments, the low-resolution LED projector(s) may project low-resolution images onto other surfaces in the room, for example at least portions of the walls, ceiling, and floors. In some embodiments, the low-resolution content projected by the low-resolution LED projectors are grayscale images. The low-resolution content may, for example, display swaying shadows of trees on the walls and ceiling, images of animals, birds flying, clouds, or of rain falling. In some embodiments, an AR light system may also be configured to emit diffuse light to illuminate a room when not emitting light representing AR content.

Physical Environment

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-Generated Reality

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR Include Virtual Reality and Mixed Reality.

Virtual Reality

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed Reality

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of Mixed Realities Include Augmented Reality and Augmented Virtuality.

Augmented Reality

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented Virtuality

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Low-Resolution Projector

Figure 1B:
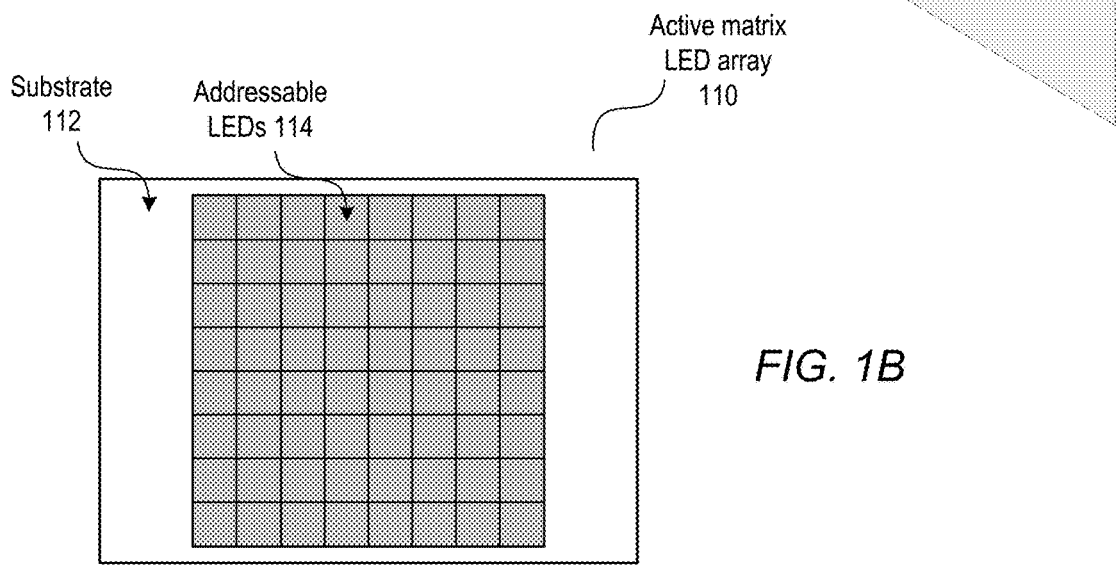
Figure 1C:
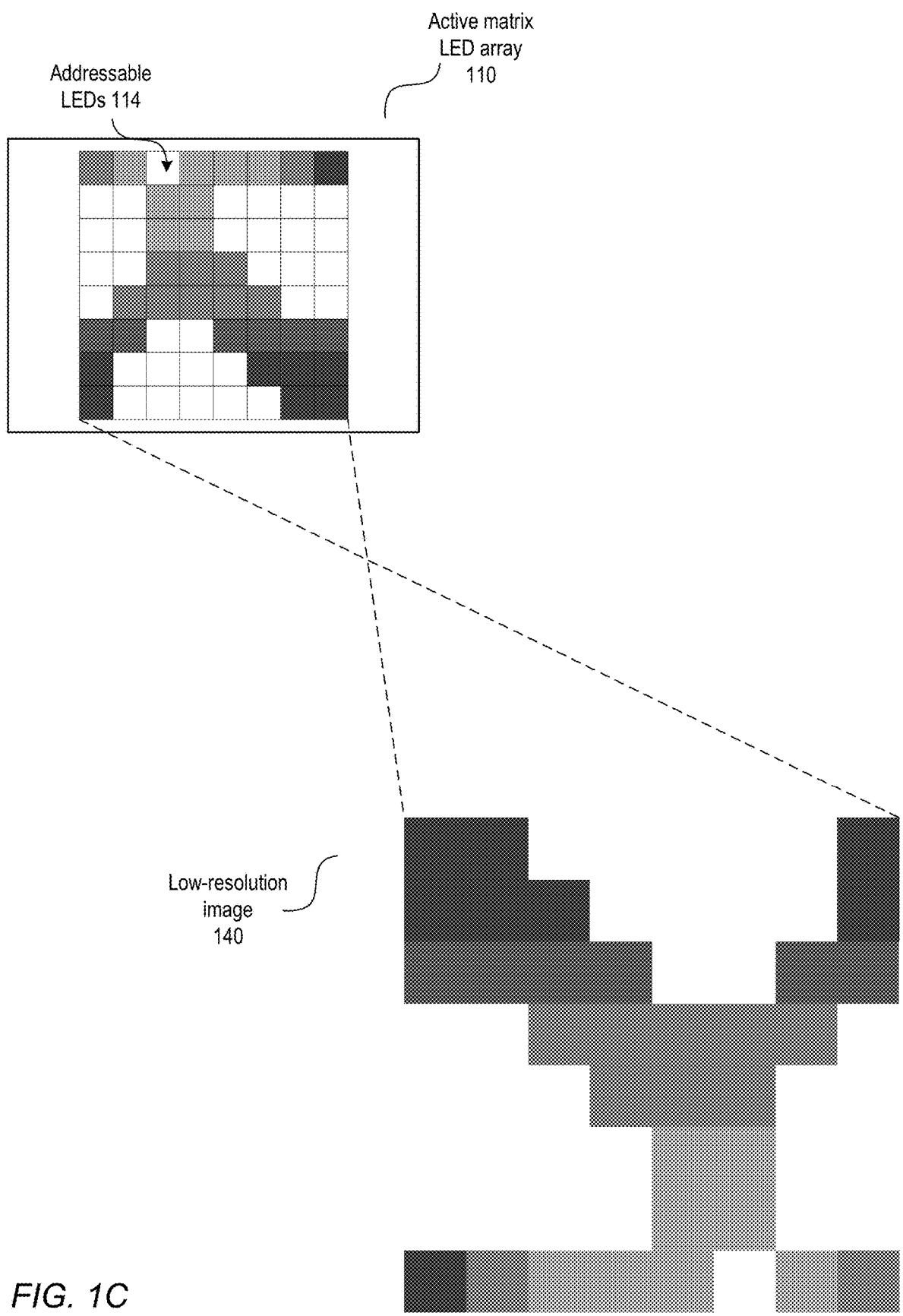

FIGS. 1A through 1C illustrate a low-resolution light-emitting diode (LED) projector for emitting light including light representing augmented reality (AR) content, according to some embodiments. FIG. 1A shows a side view of a low-resolution LED projector 100. The projector 100 may include, but is not limited to, an active matrix low-resolution LED array 110 and a focusing lens 120. As shown in FIG. 1B, the LED array 110 may be an array of individually addressable LEDs 114 mounted on a substrate 112. While FIGS. 1A and 1B show an 8×8 array of individually addressable LEDs 114 for illustrative purposes, in some embodiments the array 110 maybe a 64×64 array of individually addressable LEDs 114. However, in some embodiments, the low-resolution LED array 110 may be smaller or larger, for example a 16×16, 32×32, 128×128, or 256×256 array of individually addressable LEDs 114. Also note that the low-resolution LED array is not necessarily a square array. In addition, while FIG. 1B shows the individual LEDs as adjacent squares for illustrative purposes, in practice there may be gaps between the individual LEDs in the array as shown in FIG. 1A.

Referring to FIG. 1A, in some embodiments, an AR light system may include a controller 130 that may, for example, provide power and video signals to the low-resolution LED projector 100. The controller 130 may generate appropriate image content and drive the LED projector 100 via the video signals. The active matrix LED array 110 is used to generate light to be projected. The video signals address individual ones of the addressable LEDs 114 in the active matrix LED array 110 to cause the individual LEDs to emit (or not emit) light at different intensities. Thus, each individual LED 114 may be considered a "pixel" in an image. The light emitted by the LEDs 114 is focused by focusing lens 120 to project a low-resolution image 140 on at least a portion of a surface (e.g., a wall or ceiling) in a room. In some embodiments, the LEDs 114 emit white light on a gray (from black (no light) to white (intense light)) scale, and thus the image 140 is a grayscale image. However, in some embodiments, the LEDs 114 may emit color light at different intensities to provide a color image 140.

The focusing lens 120 may include a simple optical refractive lens configured to focus the image emitted by the active matrix LED array 110 at appropriate working distances. The optical lens may be a relatively simple and low cost lens, as aberration correction is not of great importance as the image resolution is low. The optical lens may, for example, be an injection molded optical plastic lens for low cost and ease of manufacture. However, an optical glass lens may be used, for example if operational temperatures are too high for a plastic lens. In some embodiments, the focusing lens 120 may be adjustable via control signals from the controller 130 to focus the image at different depths.

FIG. 1C illustrates generating an image 140 with an active matrix LED array 110, according to some embodiments. Each addressable LED 114 in the active matrix LED array 110 (which may be referred to as an LED pixel) is individually addressable using pulse width modulation (PWM) to emit light on a gray (from black (no light) to white (intense light)) scale, and thus the image 140 is a grayscale image. Thus, the active matrix LED array 110 may project a low resolution grayscale image onto a surface of a room. As shown in FIGS. 2A through 2D, in some embodiments of an AR light system, multiple low-resolution LED projectors 100 may be combined to provide full room coverage in conjunction with a high-resolution LED projector.

AR Light System

Figure 2A:
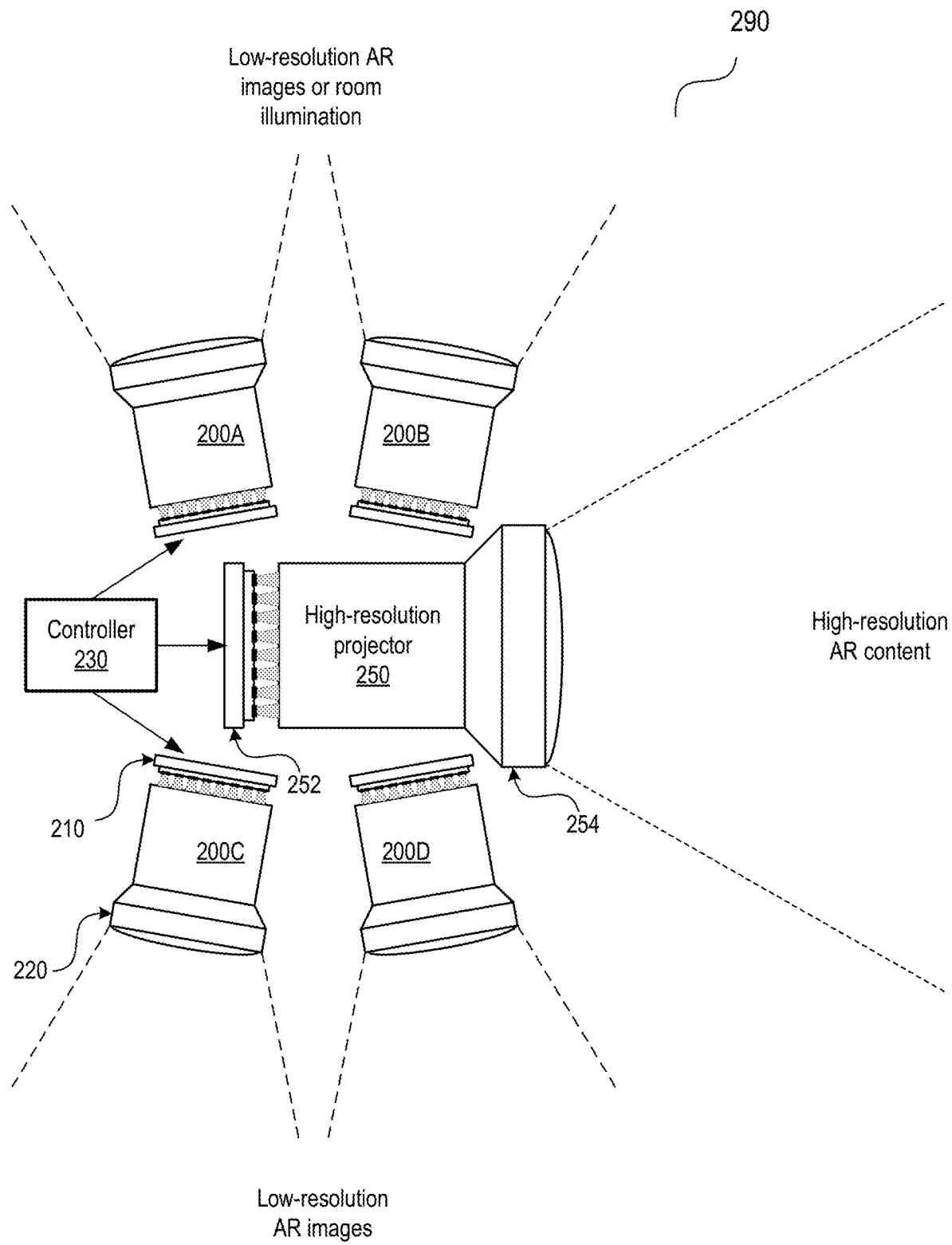
FIGS. 2A and 2B illustrate an AR light system that emits light including light representing AR content that includes multiple low-resolution LED projectors and a high-resolution LED projector, according to some embodiments.
Figure 2B:
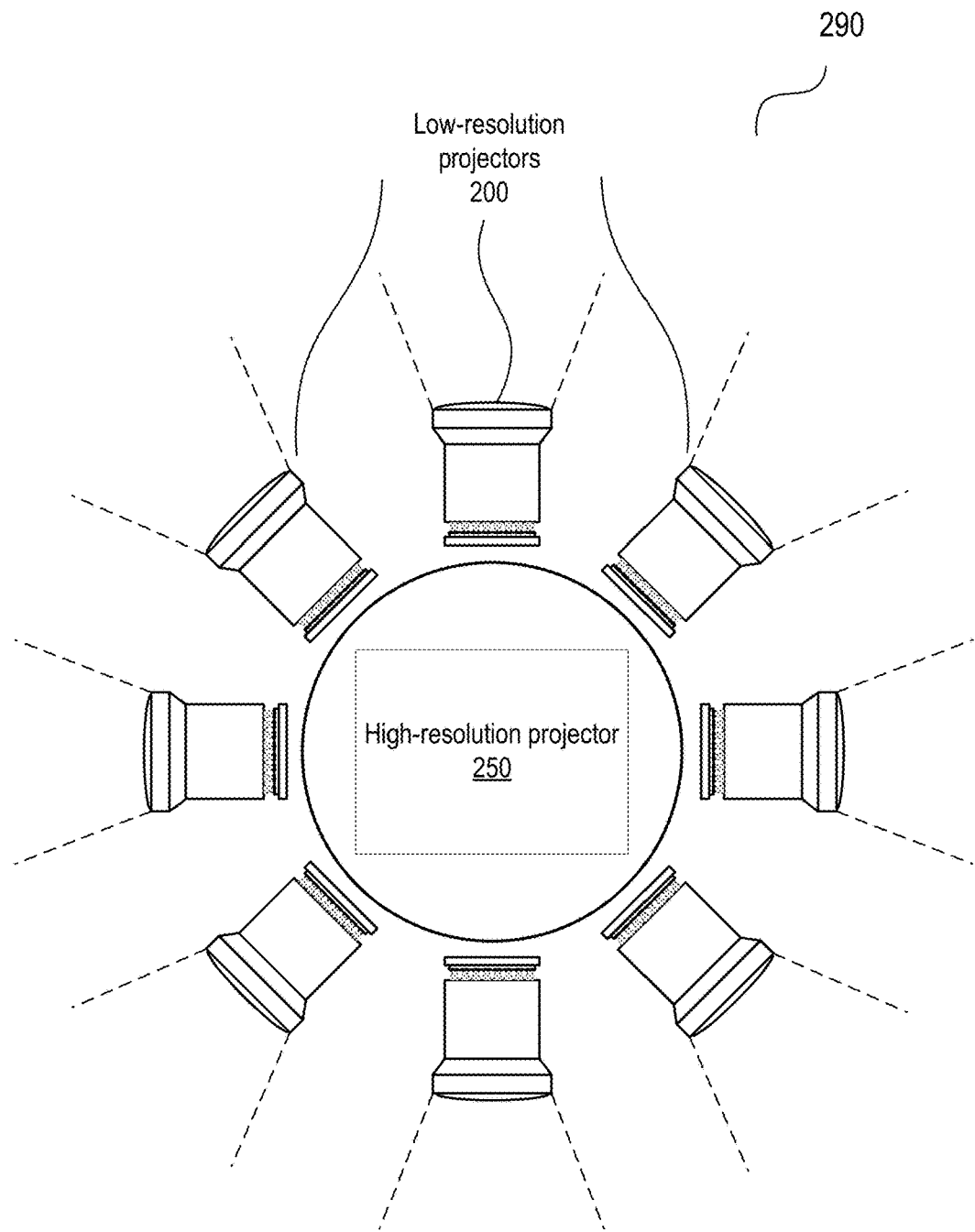

FIGS. 2A and 2B illustrate an AR light system 290 that emits light including light representing AR content that includes multiple low-resolution LED projectors 200 and a high-resolution LED projector 250, according to some embodiments. FIG. 2A shows a side view of an example AR light system 290, while FIG. 2B shows a bottom view of the example AR light system 290. In some embodiments, an AR light system 290 may include a single high-resolution LED projector 250 for emitting light including light representing high-resolution AR content surrounded by multiple low-resolution LED projectors 200 for emitting light including light representing low-resolution AR content. The AR light system 290 may provide both room illumination, as per conventional room lighting (e.g., light fixtures or light bulbs), as well as projecting both high and low resolution AR and VR imagery onto surfaces in the room. The imagery may, for example, be projected onto the floor, walls, and ceiling of a room. However, the AR light system 290 may also intelligently augment particular objects found within the room.

Each low-resolution LED projector 200 may include a relatively simple, active matrix low-resolution LED array 210 and a focusing lens 220, for example as shown in FIGS. 1A through 1C. The focusing lens 220 may be a relatively simple, low-cost lens, and is not required to be an optically "perfect" lens. The LED array 210 may, for example, be a 64×64 array of individually addressable LEDs. However, in some embodiments, the low-resolution LED array 210 may be smaller or larger, for example a 32×32, 128×128, or 256×256 array. Also note that the low-resolution LED array is not necessarily a square array.

The high-resolution LED projector 250 may include an active matrix high-resolution LED array 252 and a focusing lens 254. The LED array 252 may, for example, be a 1024×1024 array of individually addressable LEDs. However, in some embodiments, the high-resolution LED array 252 may be larger or smaller, for example a 512×512 or 2 k×2 k array. In some embodiments, resolution (number of LEDs) of the high-resolution LED array 252 may be a standard resolution format, for example 1024×768 or 1920×1080. In some embodiments, the high-resolution LED array 252 may emit color light at different intensities to provide a color high-resolution image.

As shown in FIG. 2A, the AR light system 290 may include a controller 230 that may, for example, provide power and video signals to the low-resolution LED projectors 200 and the high-resolution LED projector 250. In some embodiments, the controller 230 may generate or render low- and high-resolution content that is provided to the low-resolution LED projectors 200 and the high-resolution LED projector 250, respectively, via respective video signals.

In some embodiments, the AR light system 290 may include wireless technology that enables wireless communications between the system 290 and other devices, such as an AR/VR system (e.g., an AR/VR headset or glasses) or a mobile multipurpose device such as a smartphone, pad or tablet device. In some embodiments, the AR light system 290 may instead or also include technology that enables wired connection between the system 290 and other devices. In some embodiments, another device, such as an AR/VR system, HMD, or smartphone, may generate or render low- and high-resolution content that is provided to the AR light system 290 controller 230 via a wired or wireless connection; the AR light system 290 then distributes the low- and high-resolution content to low-resolution LED projectors 200 and the high-resolution LED projector 250 via respective video signals. In some embodiments, an external device such as a smartphone may include applications or interfaces that allow a user to control operations of the AR light system 290, for example to select video content to be displayed by the low- and high-resolution LED projectors, to switch between projecting virtual content and room illumination, to control the brightness of the system 290 in either display or illumination mode, to signal actuators to reposition or refocus one or more of the projectors, and so on. An example controller 230 is further illustrated in FIG. 13.

While not shown in FIGS. 2A and 2B, in some embodiments, the low-resolution LED projectors 200 and the high-resolution LED projector 250 may include integrated optical detection systems to detect objects and surfaces (e.g., people and specular surfaces such as mirrors or windows) within a room. The optical detection systems may also determine depth of objects or surfaces within a room. In some embodiments, the optical detection systems may use infrared (IR) light to detect objects or surfaces. Information about objects and surfaces within a room collected by the optical detection systems may be fed back to the controller 230, which may use the information in controlling operation of the low-resolution LED projectors 200 and the high-resolution LED projector 250. For example, upon detecting a person within the room, the controller 230 may lower the intensity of the light projected towards that person by one or more of the low-resolution projectors 200 to avoid "dazzling" the person with intense light. As another example, the controller 230 may adjust focus of one or more of the projectors via control signals to focus the projected imagery at different depths as detected by the optical detection systems.

While not shown in FIGS. 2A and 2B, in some embodiments, components of the AR light system 290 including but not limited to the low-resolution LED projectors 200 and the high-resolution LED projector 250 may be packaged or contained within an enclosure or "bulb-like" structure of a transparent or semi-transparent material (e.g., glass or plastic). While not shown in FIGS. 2A and 2B, in some embodiments, the AR light system 290 may be connected to electrical power, for example via a conventional light socket or via a conventional power plug. Embodiments of the AR light system 290 may, for example, be hung from a ceiling, or mounted on floor or table stands. While not shown in FIGS. 2A and 2B, in some embodiments, the AR light system 290 may include a passive heat dissipation mechanism that may, for example, include passive heat sinks on the LED arrays of the low- and high-resolution projectors and cooling air vents near the bottom and top of the enclosure that allow passive air flow through the enclosure.

While not shown in FIGS. 2A and 2B, in some embodiments, the low-resolution LED projectors 200 and the high-resolution LED projector 250 may include switchable diffusers to diffuse light emitted by the LED arrays 210 and 252 when using the AR light system 290 for room illumination. In some embodiments, the switchable diffusers may also be used to project image content (e.g., icons or signals) onto the surface of the AR light system 290's enclosure.

While not shown in FIGS. 2A and 2B, in some embodiments, the high-resolution LED projector 250 may include an actuator to move the projector 250 so that the high-resolution AR content can be directed to different locations or surfaces within a room. In some embodiments, one or more of the low-resolution LED projectors 200 may instead or also include actuators to move the projectors 200.

Figure 2C:
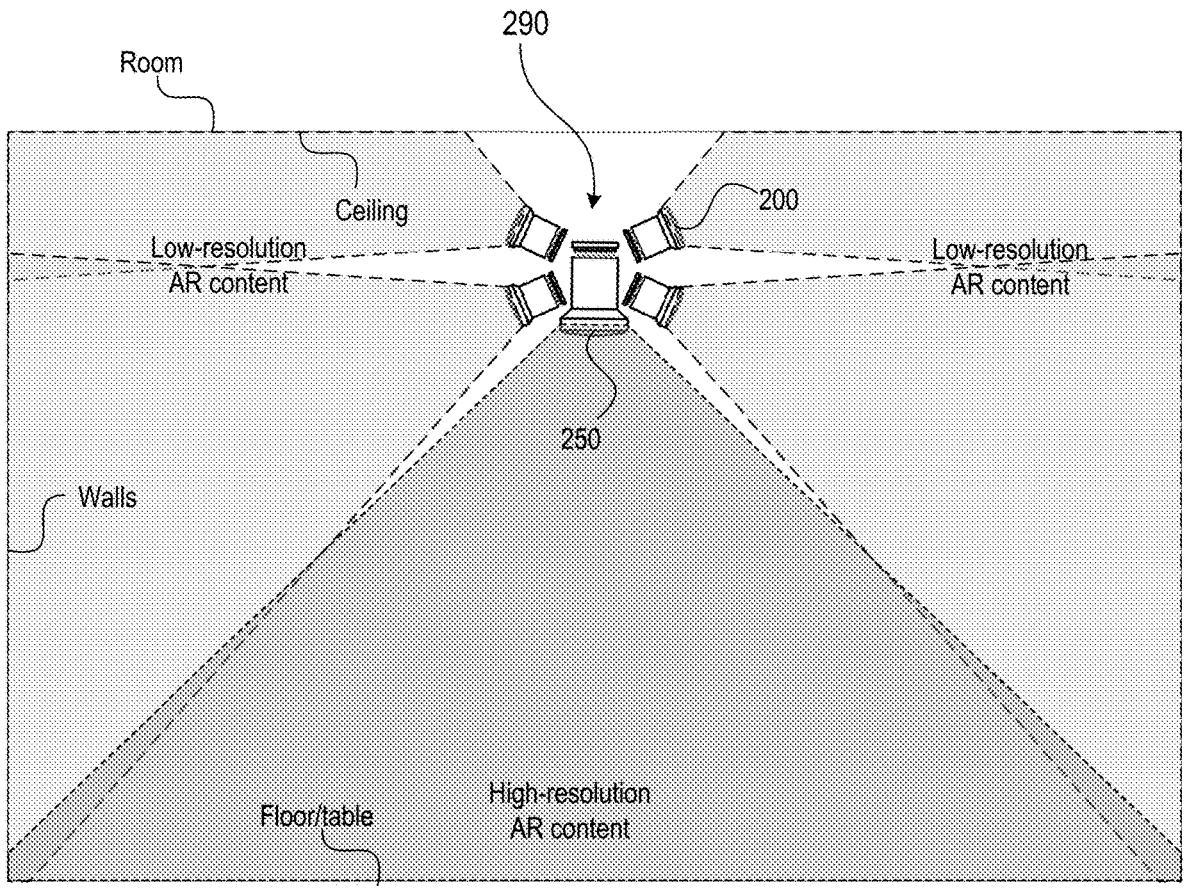
FIG. 2C graphically illustrates an AR light system as illustrated in FIGS. 2A and 2B projecting low- and high-resolution AR content onto surfaces of a room, according to some embodiments.

Embodiments of the AR light system 290 may be used to project AR content onto one or more surfaces of a room. FIG. 2C graphically illustrates an AR light system as illustrated in FIGS. 2A and 2B projecting low- and high-resolution AR content onto surfaces of a room, according to some embodiments. The low-resolution LED projectors 200 may emit light including light representing low-resolution AR content, and the high-resolution LED projector 250 may emit light including light representing high-resolution AR content. In some embodiments, the high-resolution LED projector 250 may be used to project a 2D image of AR or virtual reality (VR) content being viewed by a person in a room using an AR/VR system (e.g., an AR/VR headset or glasses) onto a surface (e.g., a wall, a table, or the floor) of the room so that other persons in the room can view what the person using the AR/VR system is seeing. In some embodiments, the low-resolution LED projectors 200 may project low-resolution images onto other surfaces in the room, for example at least portions of the walls, ceiling, and floors. In some embodiments, the low-resolution content projected by the low-resolution LED projectors are grayscale images. The low-resolution content may, for example, display swaying shadows of trees on the walls and ceiling, images of animals, birds flying, clouds, or of rain falling.

Figure 2D:
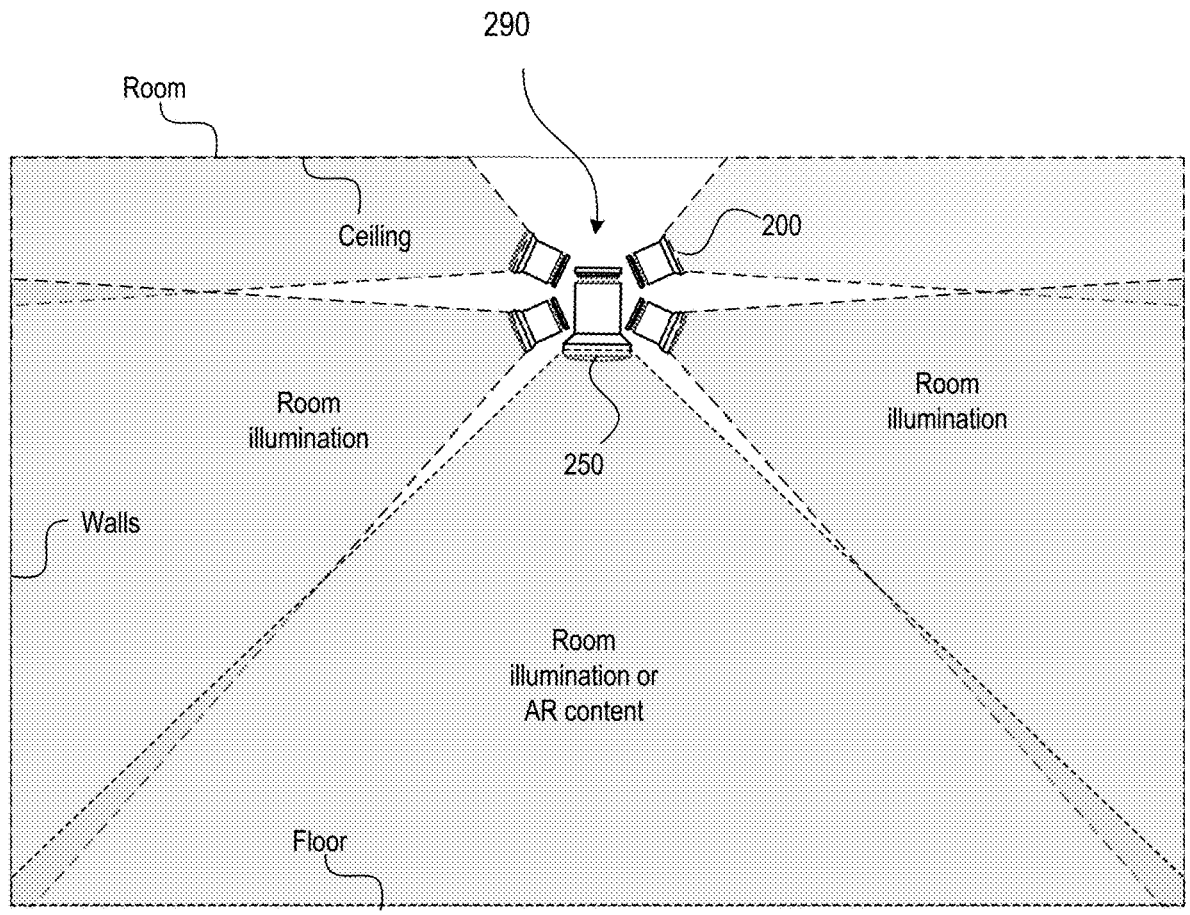
FIG. 2D graphically illustrates an AR light system as illustrated in FIGS. 2A and 2B being used to illuminate a room, according to some embodiments.

In some embodiments, the AR light system 290 may be configured to emit diffuse light to illuminate a room when not emitting light representing AR content, or alternatively the low-resolution projectors 200 may emit diffuse light while the high-resolution projector 250 emits light including AR content. FIG. 2D graphically illustrates an AR light system as illustrated in FIGS. 2A and 2B being used to illuminate at least a portion of the room, according to some embodiments. In these embodiments, the low-resolution LED projectors 200 and/or the high-resolution LED projector 250 may be configured to emit diffuse white light if room illumination (with or without AR content) is required or desired. In some embodiments, the low-resolution LED projectors 200 and/or the high-resolution LED projector 250 may be defocused so that the inter-pixel gaps are not imaged into the room. However, the low-resolution LED projectors 200 and/or the high-resolution LED projector 250 may still be focused enough so that AR image content can be viewed. Thus, there may be a balance between the AR imaging functionality and the room illumination functionality of the AR light system 290.

Figure 3A:
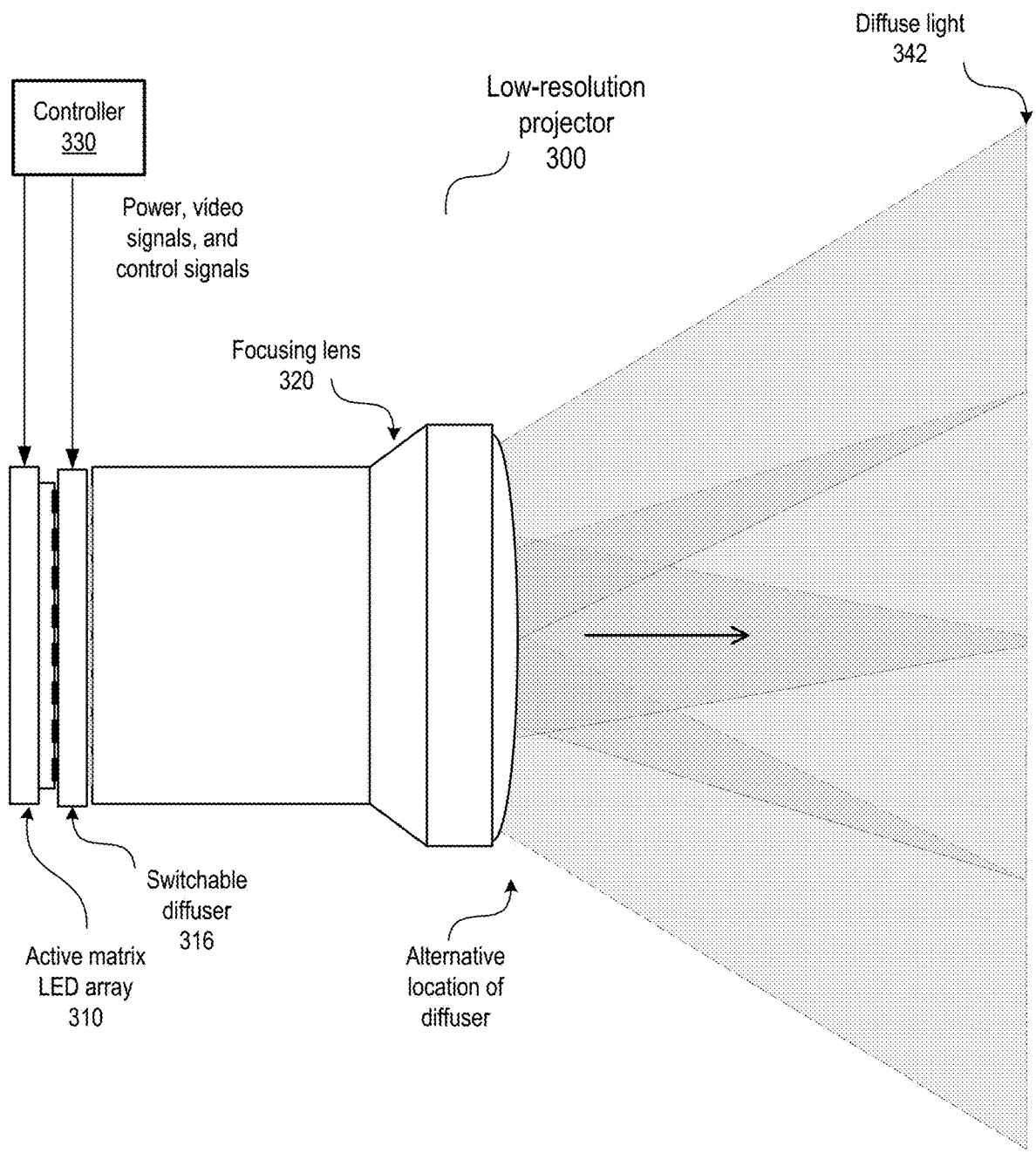
FIG. 3A illustrates a low-resolution LED projector that includes a switchable diffuser, according to some embodiments.
Figure 3B:
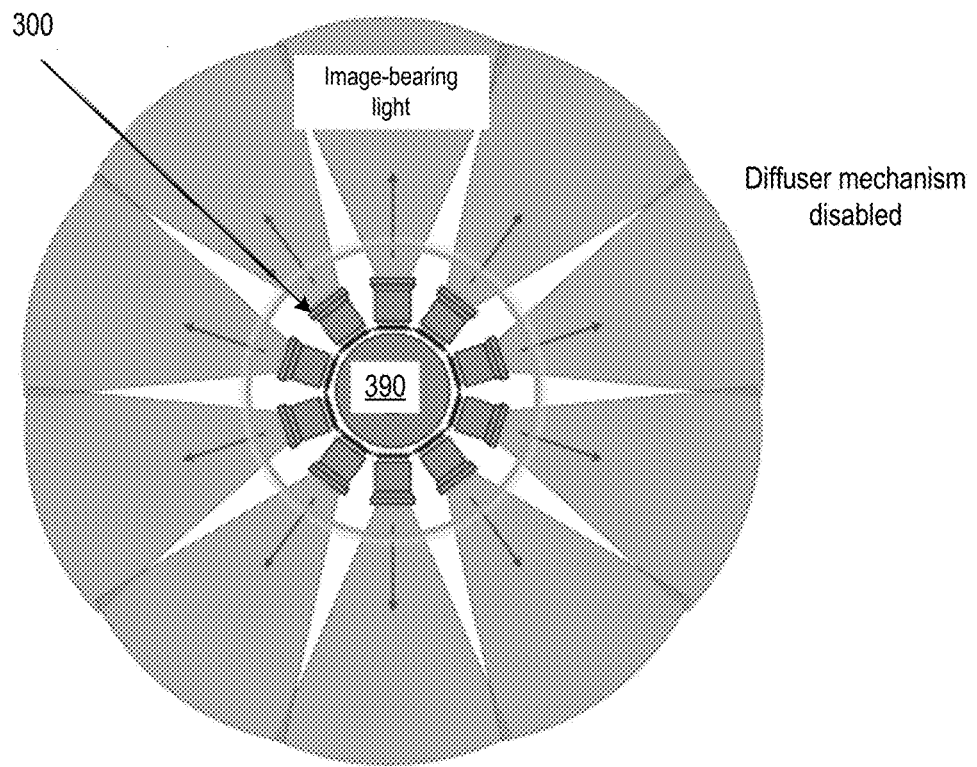
FIG. 3B graphically illustrates an AR light system emitting image-bearing light with the switchable diffuser mechanisms disabled.
Figure 3C:
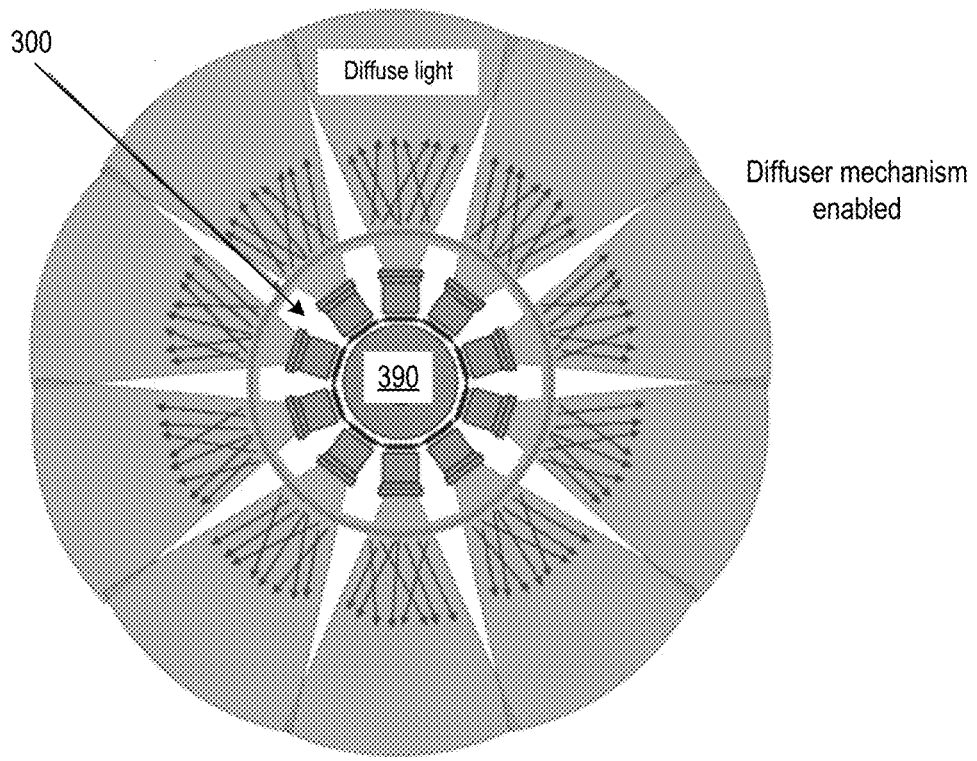
FIG. 3C graphically illustrates an AR light system emitting diffuse light with the switchable diffuser mechanisms enabled.

While not shown in FIG. 2D, in some embodiments, the low-resolution LED projectors 200 may include switchable diffusers to diffuse light emitted by the projectors 200 when using the AR light system 290 for room illumination. In some embodiments, the switchable diffusers may also be used to project image content (e.g., icons or signals) onto the surface of the AR light system 290's enclosure. In some embodiments, the high-resolution LED projector 250 may also include a diffuser mechanism AR Light System Diffusers FIG. 3A illustrates a low-resolution LED projector 300 that includes a switchable diffuser 316 mechanism, according to some embodiments. The active matrix LED array 310 may include an array of separate LED dies with gaps between the LEDs (also referred to as pixels). Without a diffuser mechanism, when the projector 300 is being used as a normal "bulb" to illuminate the room, the gaps between the LEDs may be imaged onto a surface in the room. To overcome this, a diffuser mechanism may be used to diffuse the light emitted by the LEDs in the array 310 so that the gaps between the pixels are not present and the projector 300 emits diffuse light 324 into the room. FIG. 3B graphically illustrates an AR light system 390 with the switchable diffuser mechanisms of the low-resolution LED projectors 300 disabled while the projectors 300 are emitting image-bearing light to project virtual content onto surfaces of a room. FIG. 3C graphically illustrates an AR light system 390 with the switchable diffuser mechanisms of the low-resolution LED projectors 300 enabled while the projectors 300 are emitting diffuse light to provide illumination within a room.

In some embodiments, the low-resolution LED projector 300 may be slightly defocused to remove the inter-pixel structure from the image. In some embodiments, the low-resolution LED projector 300 may have un-corrected optical aberrations in the lens 320 to remove the inter-pixel structure from the image. In some embodiments, the low-resolution LED projector 300 may include a simple mechanical actuator that may be controlled by the controller 330 to remove the inter-pixel structure from the image by defocusing the low-resolution LED projector 300 when in illumination mode. In some embodiments, the low-resolution LED projector 300 may include a switchable diffuser 316 that may be activated by the controller 330 when in illumination mode to remove the inter-pixel structure from the image. As shown in FIG. 3A, in some embodiments, the switchable diffuser 316 may be located between the LED array 310 and the focusing lens 320. Alternatively, the switchable diffuser 316 may be located elsewhere in the projector 300, for example in front of the focusing lens 320.

While not shown, in some embodiments, a high-resolution LED projector of an AR light system may also include a switchable diffuser mechanism similar to that shown in FIG. 3A to diffuse the light emitted by the high-resolution LED projector when in illumination mode.

Figure 3D:
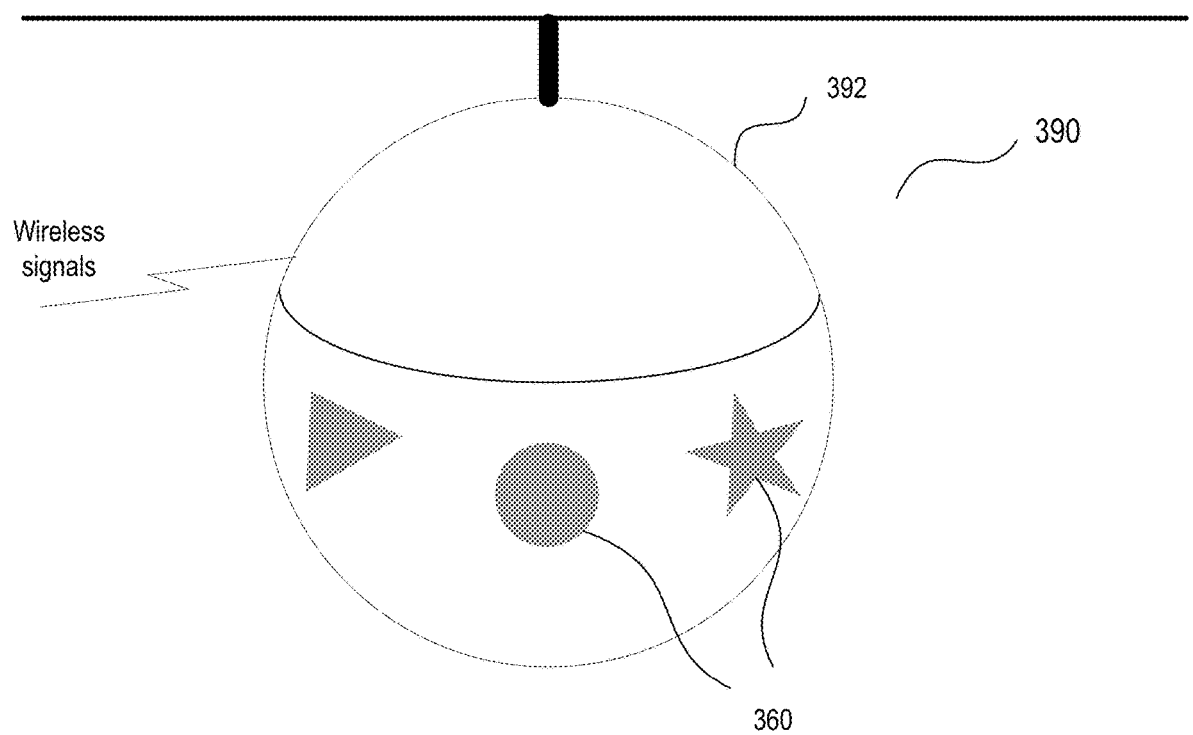
FIG. 3D graphically illustrates projecting image content onto a surface of an AR light system with the diffuser enabled, according to some embodiments.

FIG. 3D graphically illustrates projecting image content onto a surface of an enclosure 392 of an AR light system 390 with the diffuser mechanisms enabled, according to some embodiments. In some embodiments, the switchable diffusers may also be used to project image content 360 onto the surface of the AR light system 390's transparent or semi-transparent enclosure 392. The image content 360 may, for example, include logos, icons representing applications or other functionalities of the system, or signals such as flashing signals that indicate new email, messages, phone calls, etc.

AR Light System Packaging and Components

Figure 4:
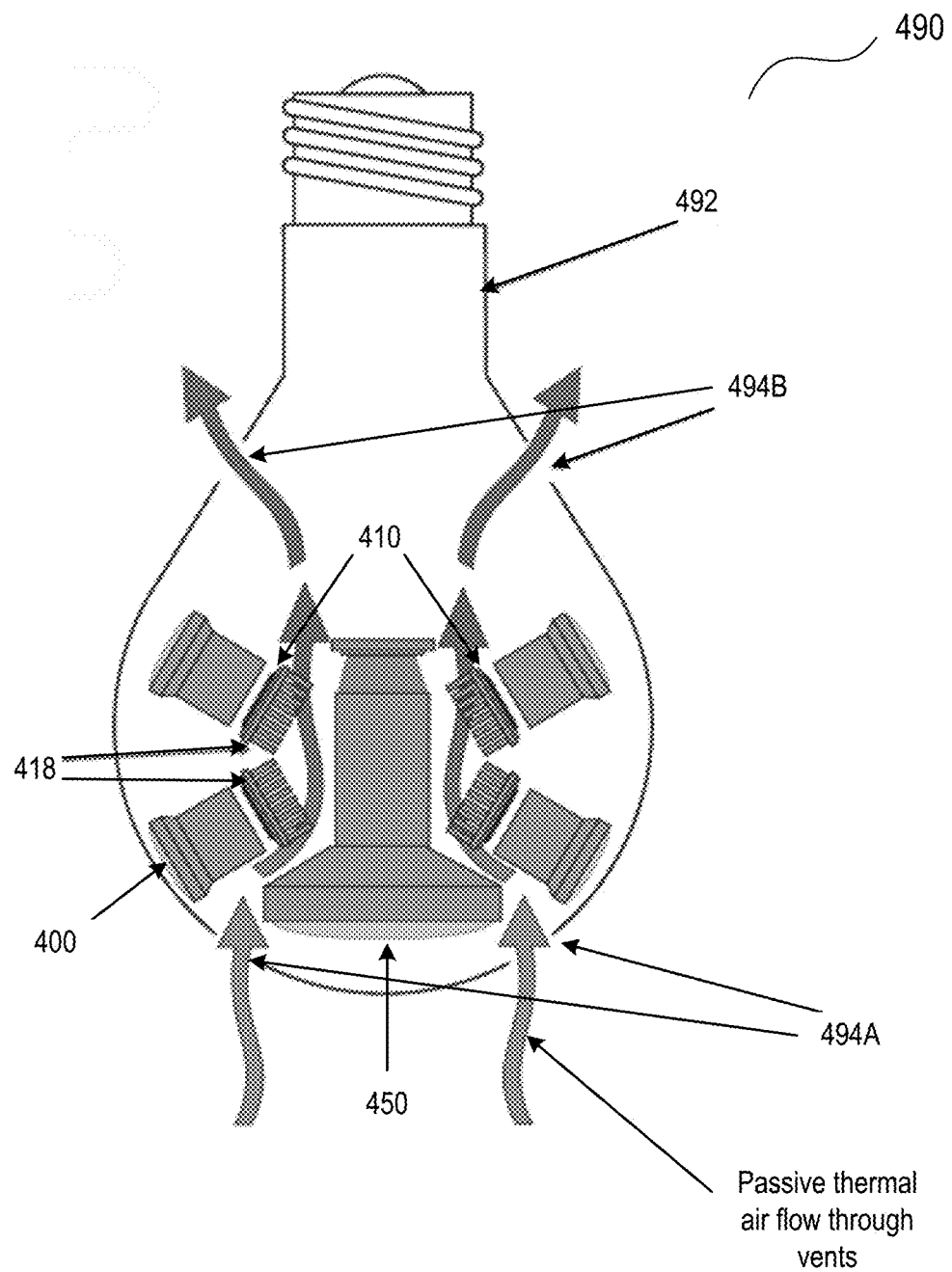
FIG. 4 illustrates a passive cooling mechanism of an AR light system, according to some embodiments.

FIG. 4 illustrates an enclosure and passive heat dissipation mechanism of an AR light system 490, according to some embodiments. In some embodiments, an AR light system 490 may include a passive heat dissipation mechanism that may include passive heat sinks 418 on the LED arrays 410 of the low-resolution LED projectors 400 and cooling air vents 494A and 494B near the bottom and top of the enclosure that allow passive thermal air flow through the AR light system 490 enclosure 492. In some embodiments, a heat sink may also be attached to the LED array of the high-resolution LED projector 450.

Figure 5:
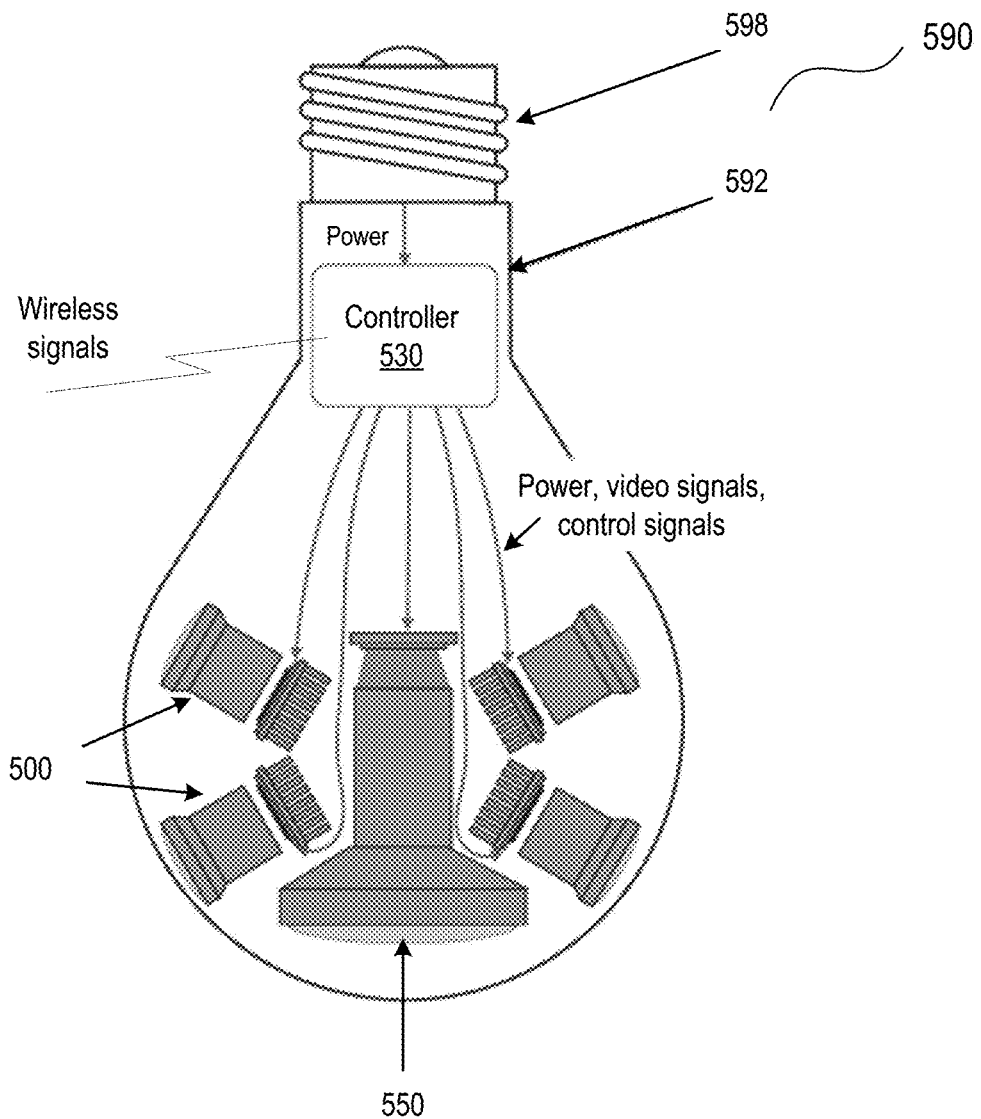
FIG. 5 illustrates a controller of an AR light system, according to some embodiments.

FIG. 5 illustrates a controller of an AR light system, according to some embodiments. In some embodiments, an AR light system 590 may include a controller 530 that may, for example, provide power and video signals to the low-resolution LED projectors 500 and the high-resolution LED projector 550. In some embodiments, the controller 530 may generate or render low- and high-resolution content that is provided to the low-resolution LED projectors 500 and the high-resolution LED projector 550, respectively, via respective video signals.

In some embodiments, components of an AR light system 590 including but not limited to the low-resolution LED projectors 500 and the high-resolution LED projector 550 may be packaged or contained within an enclosure or "bulb-like" structure 592 of a transparent or semi-transparent material (e.g., glass or plastic). In some embodiments, the AR light system 590 may be connected to electrical power, for example via a conventional light socket 598 or via a conventional power plug. Embodiments of the AR light system 590, may, for example, be hung from a ceiling, or mounted on floor or table stands.

In some embodiments, the controller 530 of the AR light system 590 may include wireless technology that enables wireless communications between the system 590 and other devices, such as an AR/VR system (e.g., an AR/VR headset or glasses) or a mobile multipurpose device such as a smartphone, pad or tablet device. In some embodiments, the AR light system 590 may instead or also include technology that enables wired connection between the system 590 and other devices. In some embodiments, another device, such as an AR/VR system, HMD, or smartphone, may generate or render low- and high-resolution content that is provided to the AR light system 590 controller 530 via a wired or wireless connection; the AR light system 590 then distributes the low- and high-resolution content to low-resolution LED projectors 500 and the high-resolution LED projector 550 via respective video signals. In some embodiments, an external device such as a smartphone may include applications or interfaces that allow a user to control operations of the AR light system 590, for example to select video content to be displayed by the low- and high-resolution LED projectors, to switch between projecting virtual content and room illumination, to control the brightness of the system 590 in either display or illumination mode, to signal actuators to reposition or refocus one or more of the projectors, and so on. An example controller 530 is further illustrated in FIG. 13.

In some embodiments, the controller 530 generates or receives video signals (e.g., from an external device such as an AR/VR device, pad or tabled device, or smartphone) and processes the signals into separate video drives for each low resolution LED projector 500 so that the final image projected by all the projectors 500 is correctly stitched and continuous. The controller 530 then provides the correct pulse width modulation to each LED pixel of each projector 500 so that the correct grayscale light output is achieved to project the imagery. A separate video signal may be received (e.g., from an external device such as an AR/VR device) and processed for the high-resolution LED projector 550.

Figure 6:
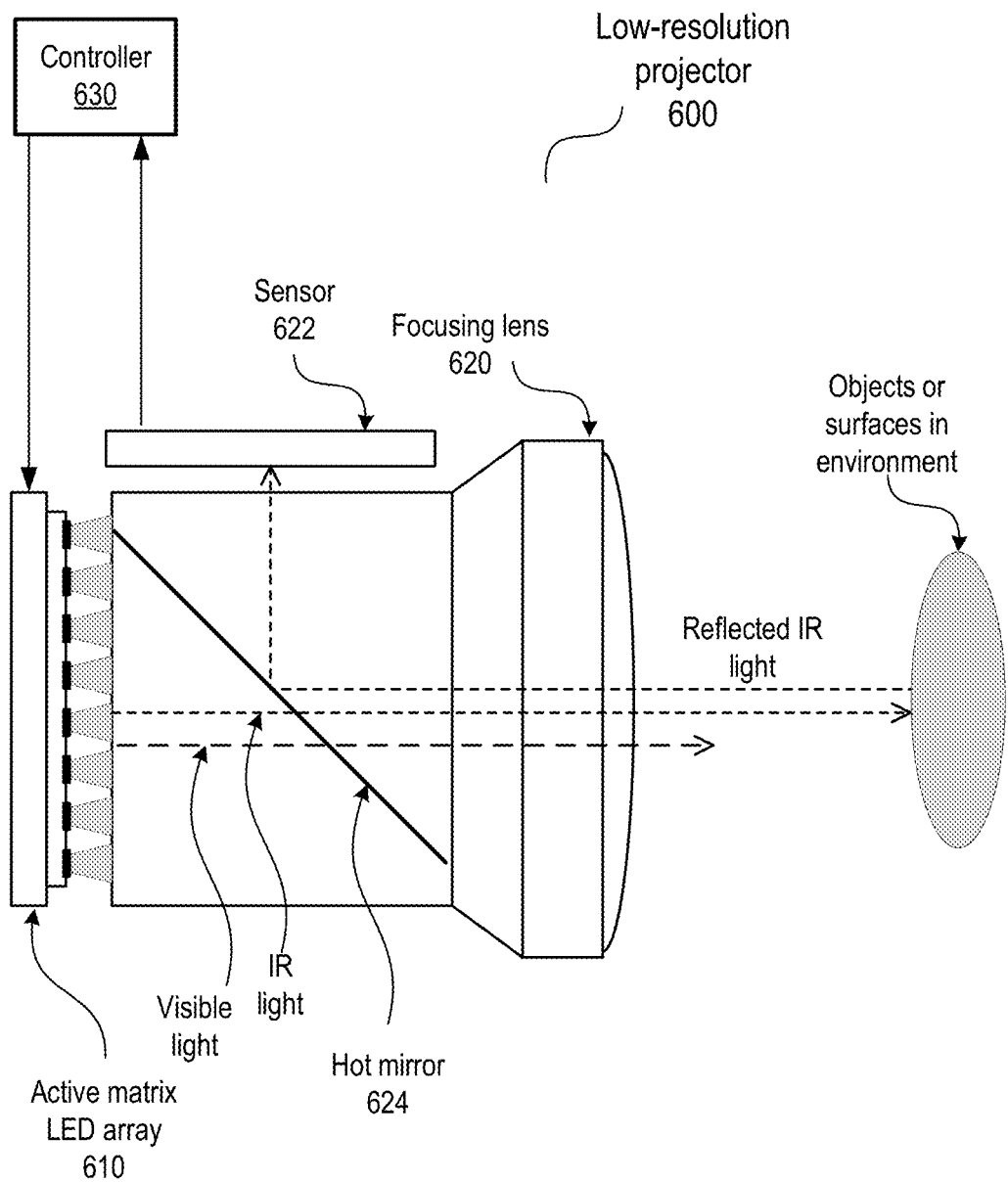
FIG. 6 illustrates a mechanism for detecting objects and surfaces so that the objects or surfaces can be selectively illuminated by the AR light system, according to some embodiments.

FIG. 6 illustrates a mechanism for detecting objects and surfaces so that the objects or surfaces can be selectively illuminated by the AR light system, according to some embodiments. In some embodiments, a low-resolution LED projector 600 may include an integrated optical detection system to detect objects and surfaces (e.g., people and specular surfaces such as mirrors or windows) within a room. The optical detection system may also determine depth of objects or surfaces within a room. In some embodiments, the optical detection system may use infrared (IR) light to detect objects or surfaces; however, in some embodiments, visible light may instead be used. Information about objects and surfaces within a room collected by the optical detection system may be fed back to the controller 630, which may use the information in controlling operation of the low-resolution LED projector 600. For example, upon detecting a person within the room, the controller 630 may lower the intensity of the light projected towards that person by the low-resolution projector 600 to avoid "dazzling" the person with intense light. As another example, the controller 630 may adjust focus of the projector 600 via control signals to focus the projected imagery at different depths as detected by the optical detection system.

In some embodiments as shown in FIG. 6, the optical detection system of a low-resolution LED projector 600 may include, but is not limited to infrared (IR) light sources such as light-emitting diodes or LEDs, for example integrated in the active matrix LED array 610, beam splitter technology (e.g., a hot mirror 624) integrated in the focusing lens 620 barrel, and a sensor 622 (e.g., an IR light image sensor). IR light pulses emitted by the IR light sources may pass through the hot mirror 624 and focusing lens 620 into the room. A portion of the IR light may be reflected off surfaces and objects in the room; the hot mirror 624 redirects the reflected IR light towards the sensor 622, which captures the reflected IR light. The controller 630 may include technology (e.g., implemented by one or more processors) to process the information captured by the sensor 622 to detect objects or surfaces within the room, and/or to detect depth of objects or surfaces within the room. For example, the controller 630 may implement structured light or time of flight depth sensing technology.

In some embodiments, the high-resolution LED projector of an AR light system may also include an integrated optical detection system to detect objects and surfaces (e.g., people and specular surfaces such as mirrors or windows) within a room.

AR Light System Alternative Embodiments

Figure 7:
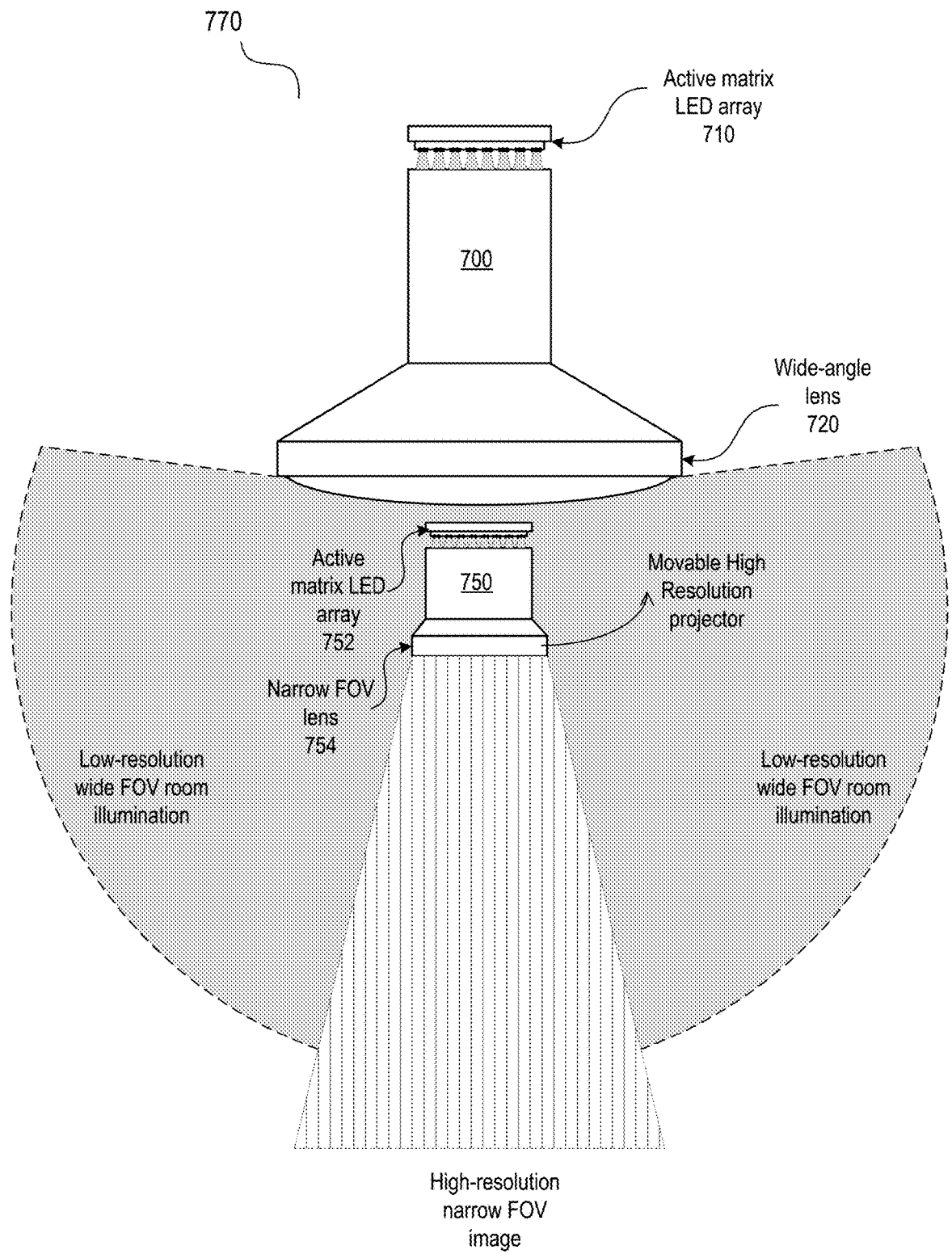
FIG. 7 illustrates an alternative AR light system that includes a single low-resolution LED projector with a wide-angle lens to disperse low-resolution AR content or diffuse light and a single high-resolution LED projector with a narrow-angle focusing lens for projecting high-resolution AR content, according to some embodiments.

FIG. 7 illustrates an alternative AR light system that includes a single low-resolution LED projector with a wide-angle lens to disperse low-resolution AR content or diffuse light and a single high-resolution LED projector with a narrow-angle focusing lens for projecting high-resolution AR content, according to some embodiments. AR light system 770 may include a single low-resolution LED projector 700 with a wide-angle or "fisheye" lens 720 to disperse low-resolution AR content or diffuse light emitted by a relatively high-resolution LED array 710 (when compared to the low-resolution LED array of an AR light system as illustrated in FIGS. 1A through 6) and a single high-resolution LED projector 750 with a narrow-angle focusing lens 754 for projecting high-resolution AR content emitted by the high-resolution LED array 752. In some embodiments, the high-resolution LED projector 750 may include an actuator to move the projector 750 so that the high-resolution AR content can be directed to different locations or surfaces within a room.

Using a single low-resolution LED projector 700 with a wide-angle or "fisheye" lens 720 in an AR light system 770 rather than multiple low-resolution LED projectors as shown in the AR light systems of FIGS. 1A through 6 may, for example, simplify the processing of low-resolution content to be projected, as processing low-resolution video signals into separate video drives for each low resolution LED projector so that the final image projected by all the projectors is correctly stitched and continuous may not be necessary.

While not shown in FIG. 7, AR light system 770 may include a controller or control system that may, for example, provide power and video signals to the low- and high-resolution LED projectors.

While not shown in FIG. 7, in some embodiments, the low-resolution LED projector 700 and/or the high-resolution LED projector 750 may include an integrated optical detection system to detect objects and surfaces (e.g., people and specular surfaces such as mirrors or windows) within a room. The optical detection system may also determine depth of objects or surfaces within a room. In some embodiments, the optical detection system may use infrared (IR) light to detect objects or surfaces. Information about objects and surfaces within a room collected by the optical detection systems may be fed back to the controller, which may use the information in controlling operation of the low-resolution LED projector 700 and/or the high-resolution LED projector 750. For example, upon detecting a person within the room, the controller may lower the intensity of the light projected towards that person by the low-resolution projector 700 to avoid "dazzling" the person with intense light. As another example, the controller may adjust focus of the projectors via control signals to focus the projected imagery at different depths as detected by the optical detection system.

While not shown in FIG. 7, in some embodiments, components of the AR light system 770 including but not limited to the low-resolution LED projector 700 and the high-resolution LED projector 750 may be packaged or contained within an enclosure or "bulb-like" structure of a transparent or semi-transparent material (e.g., glass or plastic). While not shown in FIG. 7, in some embodiments, the AR light system 770 may be connected to electrical power, for example via a conventional light socket or via a conventional power plug. Embodiments of the AR light system 770 may, for example, be hung from a ceiling, or mounted on floor or table stands. While not shown in FIG. 7, in some embodiments, the AR light system 770 may include a passive heat dissipation mechanism that may, for example, include passive heat sinks on the LED arrays of the low- and high-resolution projectors and cooling air vents near the bottom and top of the enclosure that allow passive air flow through the enclosure.

While not shown in FIG. 7, in some embodiments, the low-resolution LED projector 700 and the high-resolution LED projector 750 may include switchable diffusers to diffuse light emitted by the LED arrays 710 and 752 when using the AR light system 770 for room illumination. In some embodiments, the switchable diffusers may also be used to project image content (e.g., icons or signals) onto the surface of the AR light system 770's enclosure.

Figure 8A:
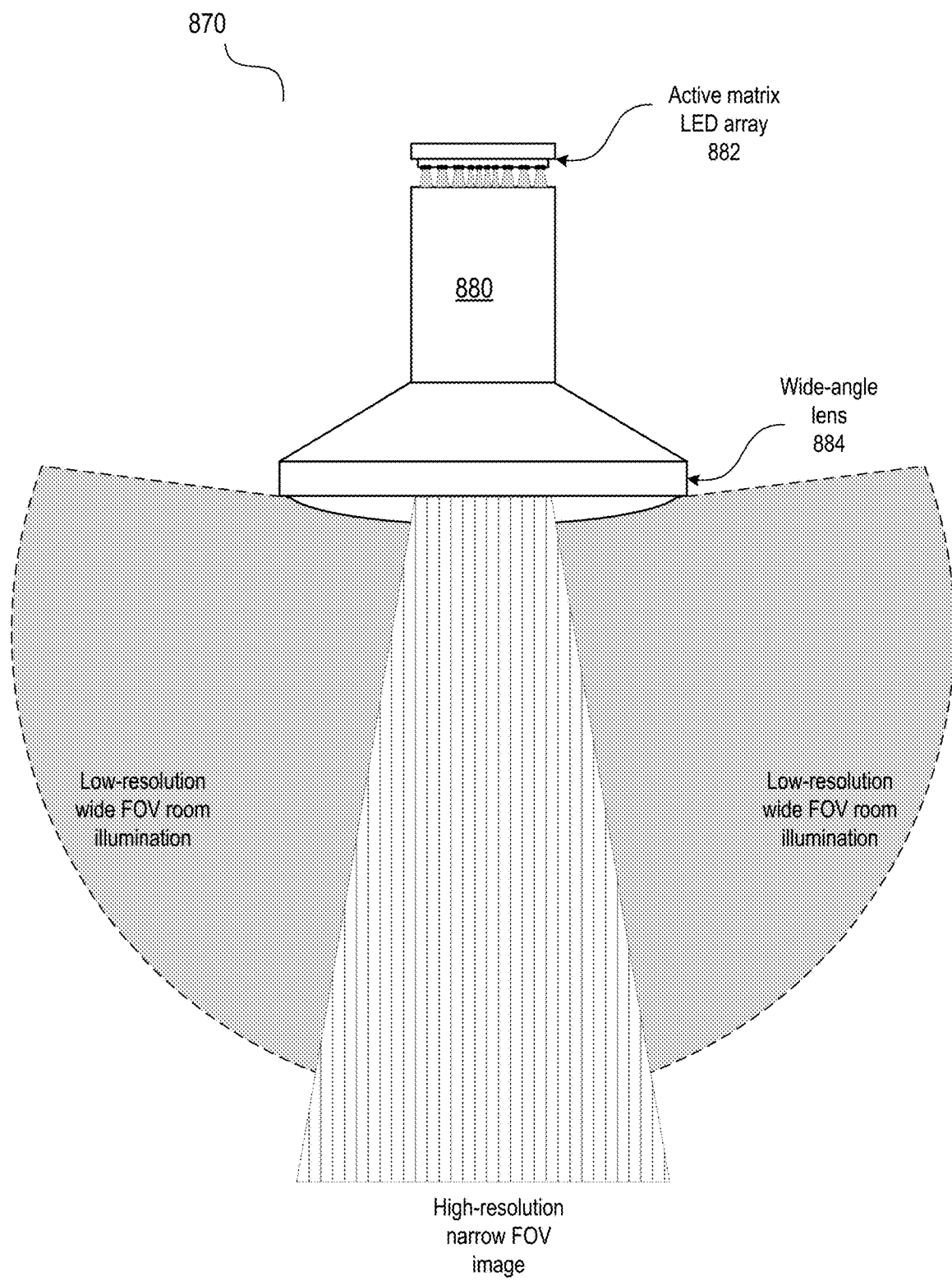
FIGS. 8A and 8B illustrate another alternative AR light system that includes a single "foveated" LED projector that includes a foveated LED array and a wide-angle lens that projects both high-resolution and low-resolution AR content, according to some embodiments.
Figure 8B:
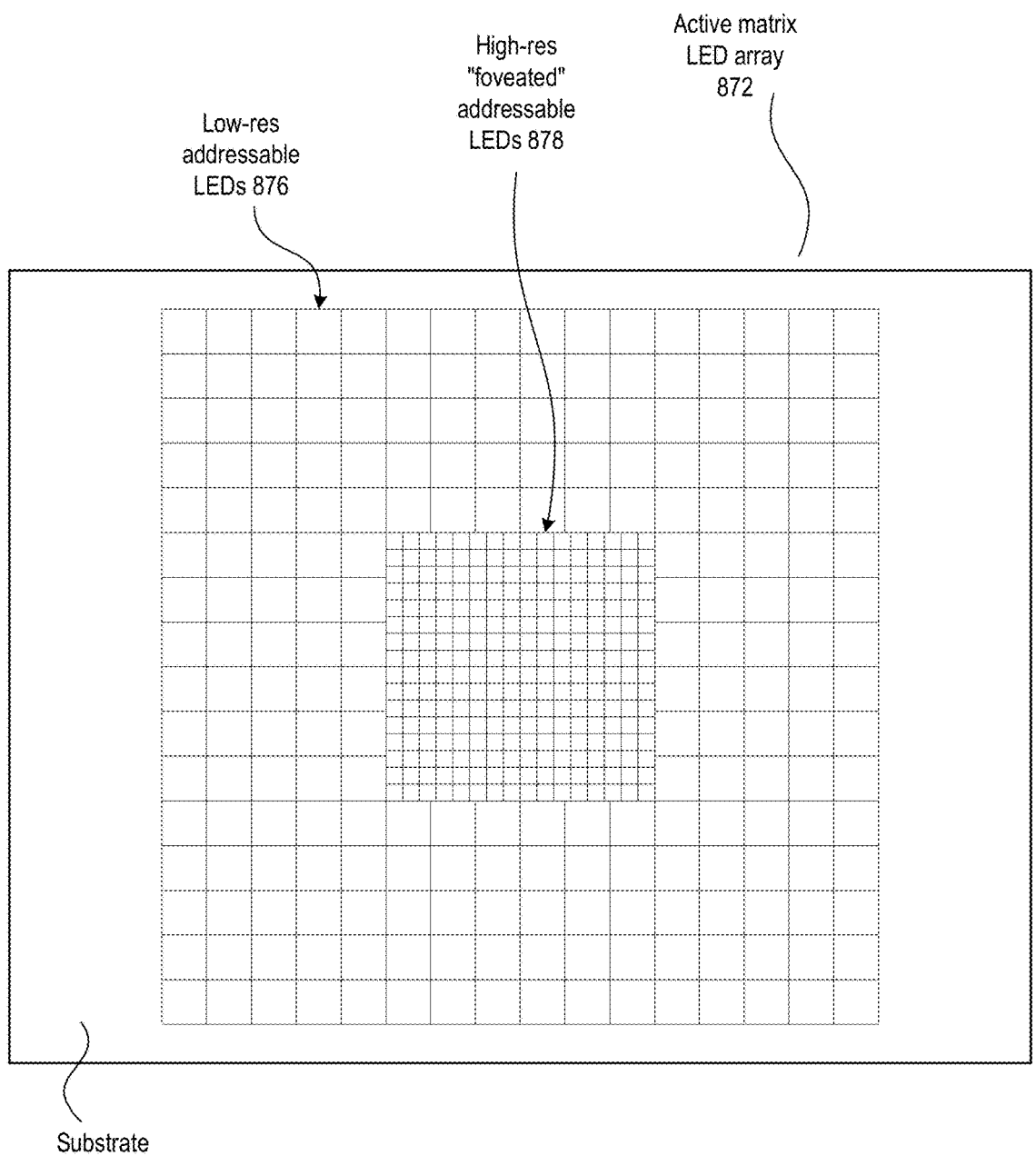

FIGS. 8A and 8B illustrate another alternative AR light system that includes a single "foveated" LED projector that includes a foveated LED array and a wide-angle lens that projects both high-resolution and low-resolution AR content, according to some embodiments. FIG. 8A illustrates an AR light system 870, according to some embodiments. In some embodiments, an AR light system 870 may include a single foveated LED projector 880 that includes a foveated active matrix LED array 882 and a wide-angle or "fisheye" lens 884 that projects both high-resolution and low-resolution AR content into a room.

FIG. 8B illustrates a foveated active matrix LED array 882, according to some embodiments. Foveated active matrix LED array 882 may include a center section that includes an array of high-resolution addressable LEDs 878 for projecting high-resolution imagery, surrounded by low-resolution addressable LEDs 876 for projecting low-resolution imagery. Note that the number of low-resolution and high-resolution "pixels" shown in FIG. 8B is for illustrative purposes; in practice, the array 882 may have more low-resolution and high-resolution pixels than shown.

Using a single foveated LED projector 880 that includes a foveated active matrix LED array 882 and a wide-angle or "fisheye" lens 884 in an AR light system 870 rather than multiple low-resolution LED projectors as shown in the AR light systems of FIGS. 1A through 6 may, for example, simplify the processing of low-resolution content to be projected, as processing low-resolution video signals into separate video drives for each low resolution LED projector so that the final image projected by all the projectors is correctly stitched and continuous may not be necessary.

While not shown in FIG. 8A, AR light system 870 may include a controller or control system that may, for example, provide power and video signals to the foveated LED projector 880.

While not shown in FIG. 8A, in some embodiments, the AR light system 870 may include an integrated optical detection system to detect objects and surfaces (e.g., people and specular surfaces such as mirrors or windows) within a room. The optical detection system may also determine depth of objects or surfaces within a room. In some embodiments, the optical detection system may use infrared (IR) light to detect objects or surfaces. Information about objects and surfaces within a room collected by the optical detection systems may be fed back to the controller, which may use the information in controlling operation of the foveated LED projector 880. For example, upon detecting a person within the room, the controller may lower the intensity of the light projected towards that person by the foveated LED projector 880 to avoid "dazzling" the person with intense light. As another example, the controller may adjust focus of the foveated LED projector 880 via control signals to focus the projected imagery at different depths as detected by the optical detection system.

While not shown in FIG. 8A, in some embodiments, components of the AR light system 870 including but not limited to the foveated LED projector 880 may be packaged or contained within an enclosure or "bulb-like" structure of a transparent or semi-transparent material (e.g., glass or plastic). While not shown in FIG. 8A, in some embodiments, the AR light system 870 may be connected to electrical power, for example via a conventional light socket or via a conventional power plug. Embodiments of the AR light system 870 may, for example, be hung from a ceiling, or mounted on floor or table stands. While not shown in FIG. 8A, in some embodiments, the AR light system 870 may include a passive heat dissipation mechanism that may, for example, include a passive heat sinks on the LED array 882 and cooling air vents near the bottom and top of the enclosure that allow passive air flow through the enclosure.

While not shown in FIG. 8A, in some embodiments, the foveated LED projector 880 may include a diffuser mechanism to diffuse light emitted by the LED array 882 when using the AR light system 870 for room illumination. In some embodiments, the diffuser mechanism may also be used to project image content (e.g., icons or signals) onto the surface of the AR light system 870's enclosure.

Color Display Content

In some embodiments, color display content can be provided by the projector(s) in the AR light systems described herein by using an array of discrete red, green, and blue conventional LED sub-pixels. In some embodiments, a tunable white output may be achieved with selected color temperature conventional white LEDs, selectively driven within the LED arrays. In some embodiments, arrays of monolithic Indium Gallium Nitride (InGaN) tunable color LEDs can be used, for example as described in: Chen, J. C., et al. "Growth of monolithic full-color light-emitting diode and its applications." *Gallium Nitride Materials and Devices XIV*. Vol. 10918. International Society for Optics and Photonics, 2019. In some embodiments, LEDs containing three different sets of quantum wells separated with intermediate carrier blocking layers may be used. In some embodiments, pulsed drive current containing different current amplitudes and widths, each creating a separate color, may be used. Alternatively a white output with tunable color temperature can be achieved.

AR Light System Applications

Figure 9:
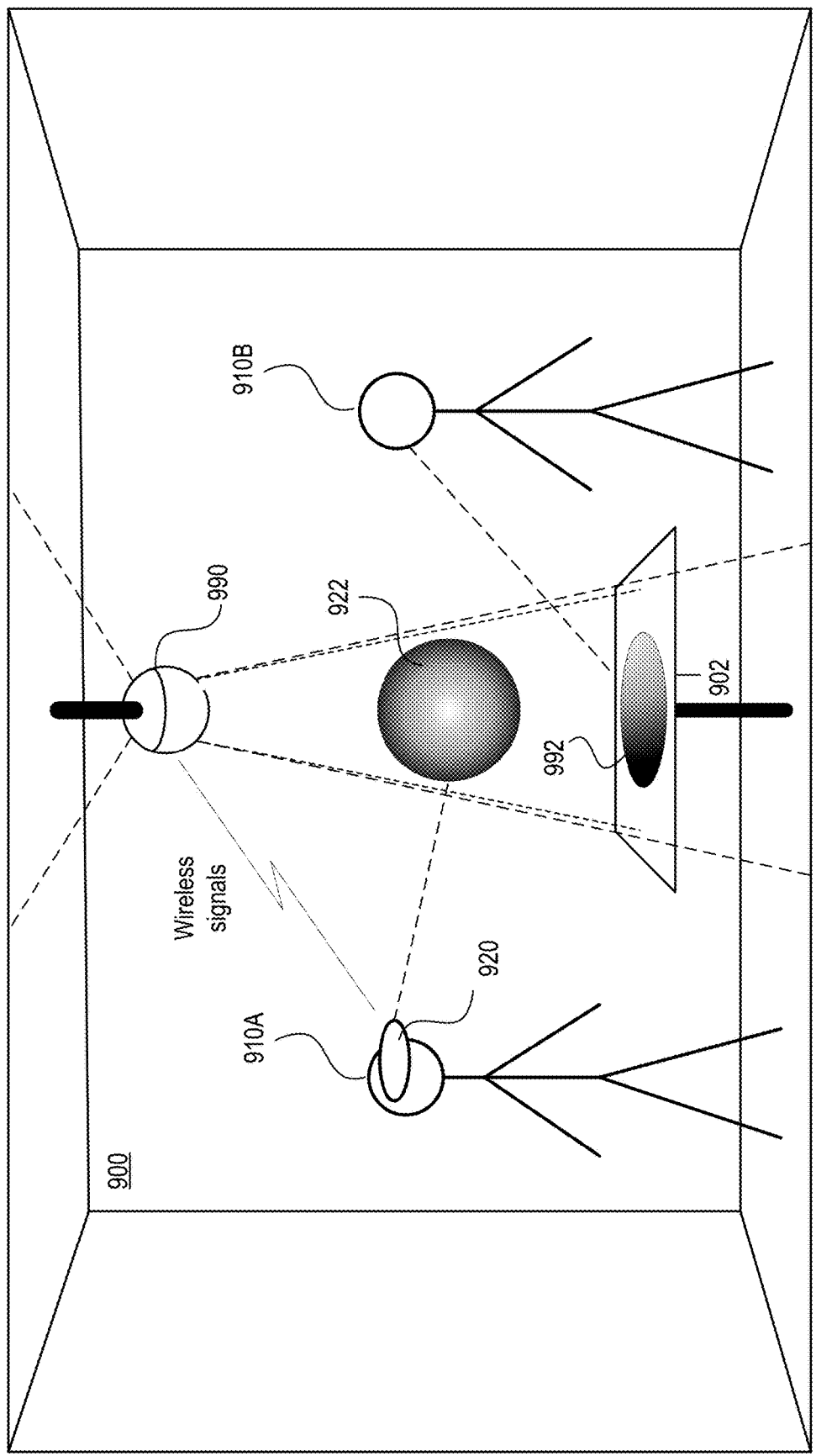
FIG. 9 graphically illustrates an AR light system in a room projecting 2D content onto a surface so that a person in the room can view a 2D representation of AR content being viewed by another person in the room via an AR/VR system, according to some embodiments.

FIG. 9 graphically illustrates an AR light system in a room projecting 2D content onto a surface so that a person in the room can view a 2D representation of AR content being viewed by another person in the room via an AR/VR system, according to some embodiments. An AR light system 990 may, for example, be suspended from a ceiling in a room 900. A person 910A in the room may be using an AR/VR system 920 (e.g., a HMD, headset, glasses, etc.) to view AR or VR content 922. The AR or VR content 922 may be provided to the AR light system 990, for example via a wireless connection. The high-resolution projector of the AR light system 990 may project a 2D rendering 992 of the AR or VR content 922 onto a surface (e.g., a table 902) so that another person 910B in the room can view a 2D representation 992 of the AR content 922 being viewed by person 910A via the AR/VR system 920. The AR light system 990 may also project low-resolution imagery or room illumination into other portions of the room using low-resolution projector(s).

Synchronization of an AR Light System with an AR/VR System

As noted above, an AR light system may project 2D content onto a surface so that person(s) in the room can view a 2D representation of AR content being viewed by another person in the room via an AR/VR system (e.g., a HMD, headset, glasses, etc.). However, a person using the AR/VR system to view AR content/imagery might also see the AR content being projected by the AR light system for viewing by other person(s) in the room. This "double augmentation" of reality may be confusing to the person using the AR/VR system. Thus, in some embodiments, the AR light system's projection of AR content may be synchronized with the AR/VR system's real-world pass through projection of AR content to mitigate this "double augmentation" that may otherwise be observable to the person using the AR/VR system in the environment (e.g., in a room).

In some embodiments, to synchronize the AR light system's projection of AR content with the AR/VR system's display of AR content to mitigate "double augmentation", the AR light system may be configured to project light only within the "dead time" of the AR/VR system's display of AR content. In other words, the AR light system emits light during intervals between "frames" being captured, augmented and projected by the AR/VR system for viewing by the AR/VR system's user. This requires active communication between the AR/VR system and the AR light system so that the AR light system can synchronize its projection system with the AR/VR system's projection system.

In some embodiments, to synchronize the AR/VR system's display of AR content with the AR light system's projection of AR content to mitigate "double augmentation", the AR/VR system acquires or passes through real-world light only within the "dead time" (i.e., the time intervals when AR content is not being projected) of the AR light system's projection of augmented reality content into the environment. When the AR light system is projecting AR content, the AR/VR system effectively "blocks" the real-world light. In some embodiments, a world-facing camera and controller of the AR/VR system may be configured to detect when the AR light system is and is not projecting AR content into the environment, and to synchronize the display or pass through of light from the environment with the time intervals in which AR content is not being projected by the AR light system. This method may be advantageous in that it does not necessarily require active communication between the AR/VR system and the AR light system.

The AR/VR system may, for example, include a system that projects AR content onto or via a transparent or translucent display (e.g., lenses of a pair of "AR glasses") through which light from the environment passes; the user sees the real environment through the transparent or translucent display augmented by the AR content. In these embodiments, a liquid crystal (LC) shutter (or other shutter technology mechanism) may be used to synchronize the pass through of light from the environment with the time intervals in which AR content is not being projected by the AR light system. The LC shutter is "open" when the AR light system is not projecting AR content, and "closed" when the AR light system is projecting AR content.

Alternatively, the AR/VR system may include a system that includes camera(s) that capture views of the real-world environment; the images captured by the camera(s) are augmented with AR content, and the images representing an augmented view of reality are then displayed on opaque displays for the user to view (e.g., displays in front of the user's eyes in a HMD). In these embodiments, camera shutter timing may be used to synchronize the capture of light from the environment with the time intervals in which AR content is not being projected by the AR light system. The camera shutter is "open" when the AR light system is not projecting AR content, and "closed" when the AR light system is projecting AR content.

AR Light System LED Arrays

Embodiments of high- and low-resolution LED arrays that may be used in the AR light systems are also described. LED arrays that include low-doped Europium to provide color temperature adjustment are described. In addition, LED arrays that include integrated LED reflectors to increase brightness are described.

Figure 10A:
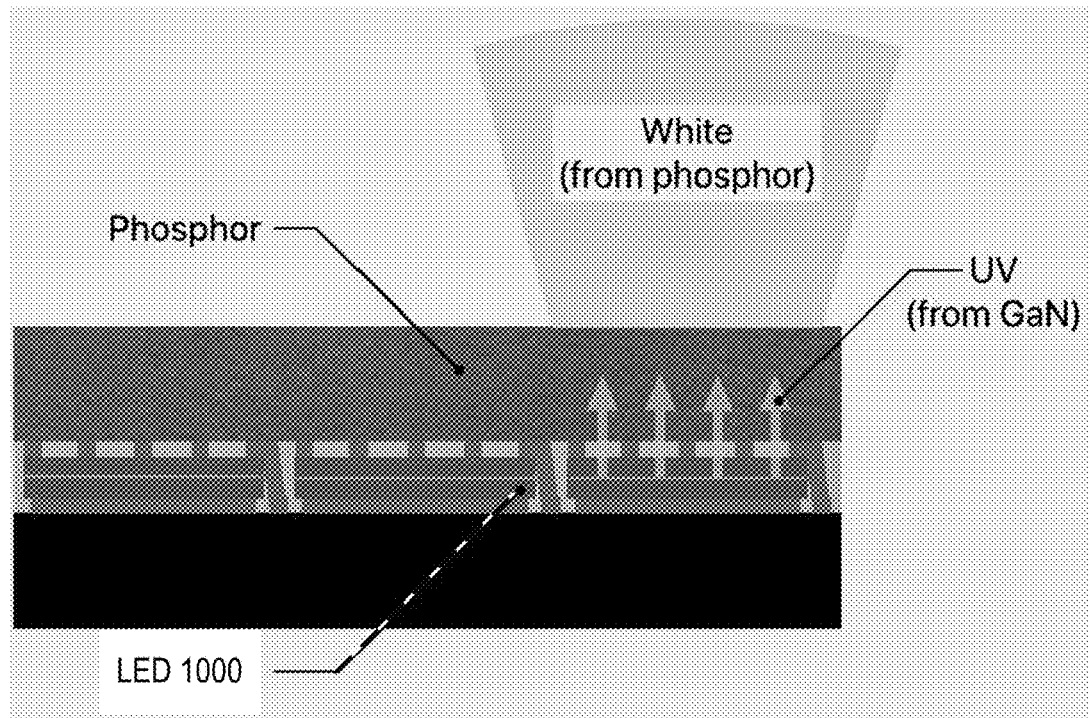
FIGS. 10A and 10B illustrate a mechanism for providing tunable color temperature in an active matrix LED array, according to some embodiments.
Figure 10B:
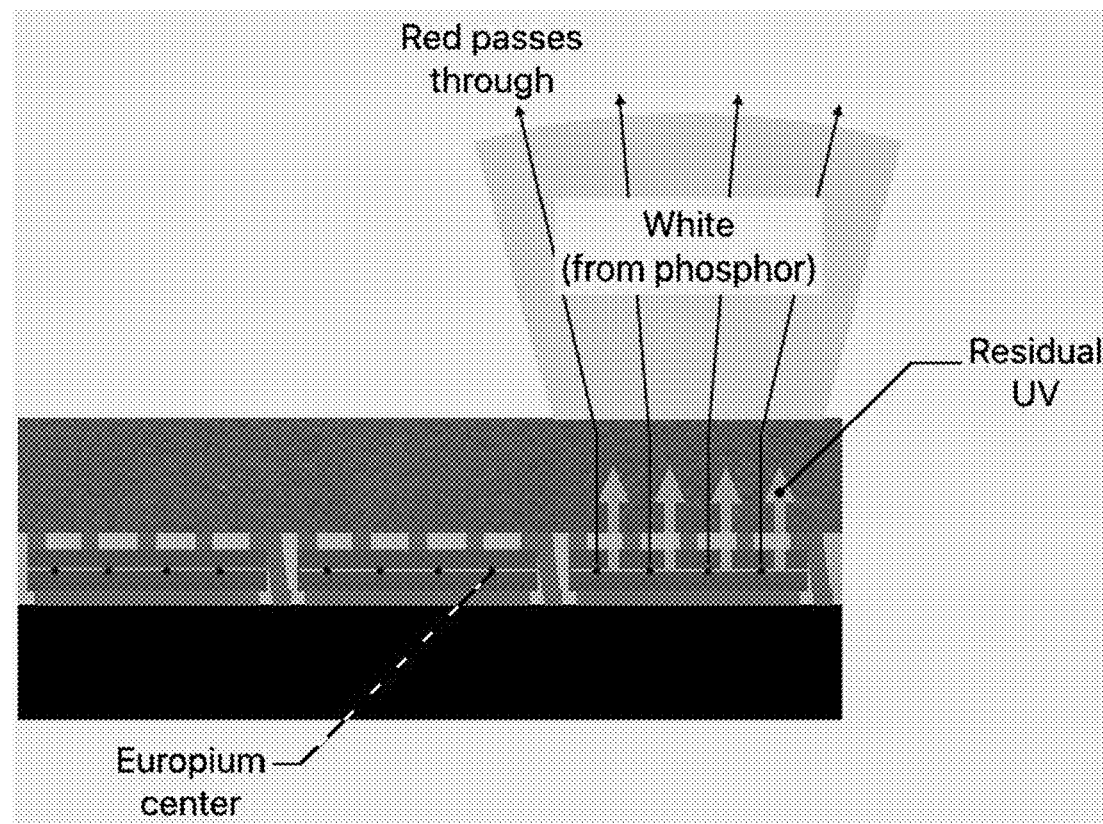

FIGS. 10A and 10B illustrate a mechanism for providing tunable color temperature in an active matrix LED array, according to some embodiments. FIG. 10A shows a Gallium Nitride (GaN) LED 1000, according to some embodiments. UV primary emission from the GaN LED is "downconverted" to broad white spectrum light by the phosphor with a pre-set color temperature. As shown in FIG. 10B, adding a small quantity of Europium into the emission layer can result in some red emission that passes through the phosphor, but is scattered. In some embodiments, the relative red vs. white appearance can be tuned by changing the peak current, and intensity can be normalized through the driving frequency.

Figure 11A:
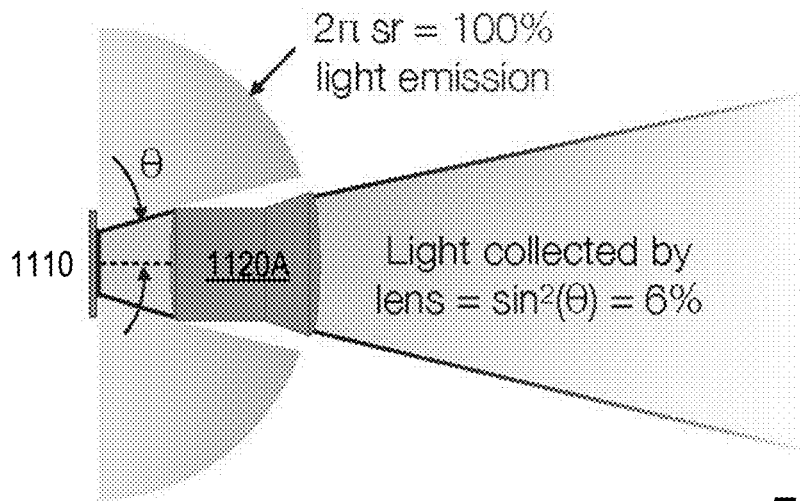
FIGS. 11A through 11C illustrate Lambertian LEDs in an LED projector, according to some embodiments.
Figure 11B:
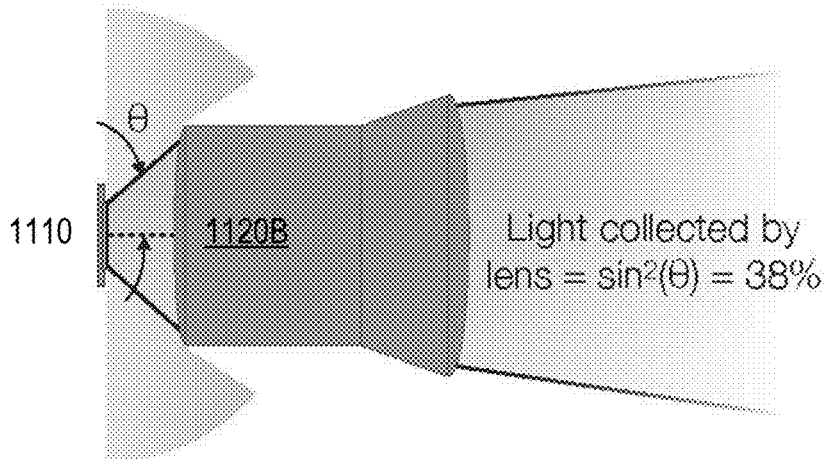
Figure 11C:
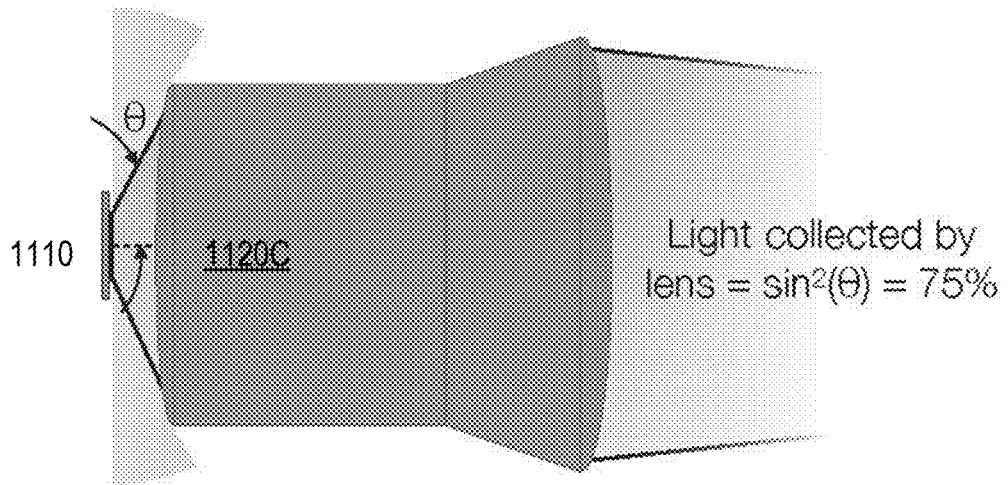

FIGS. 11A through 11C illustrate Lambertian LEDs in an LED projector using focusing lenses 1120 of different aperture sizes, according to some embodiments. LED 1000 is a Lambertian emitter. Light is emitted into $2\pi$ steradians. To collect as much light as possible requires a lens 1120 with a very large numerical aperture, for example as shown in FIG. 11C. This drives up the size, complexity, and cost of the lens 1120. Collecting 100% of the light may be impossible. A low collection efficiency results in a low bulb brightness, which may result in hard-to-see imagery and increased thermal dissipation. Thus, there is a need to decrease the cone angle of emission for each LED in the array.

Figure 12A:
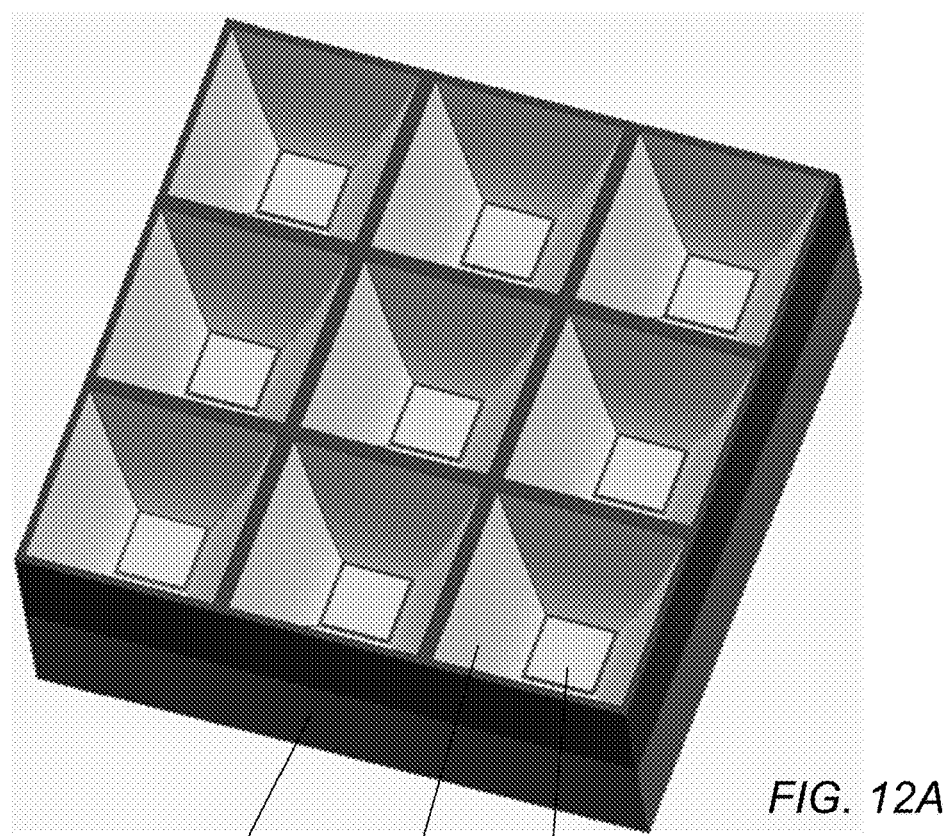
FIGS. 12A and 12B illustrate integrated LED reflectors for increased light collection in an LED projector, according to some embodiments.
Figure 12B:
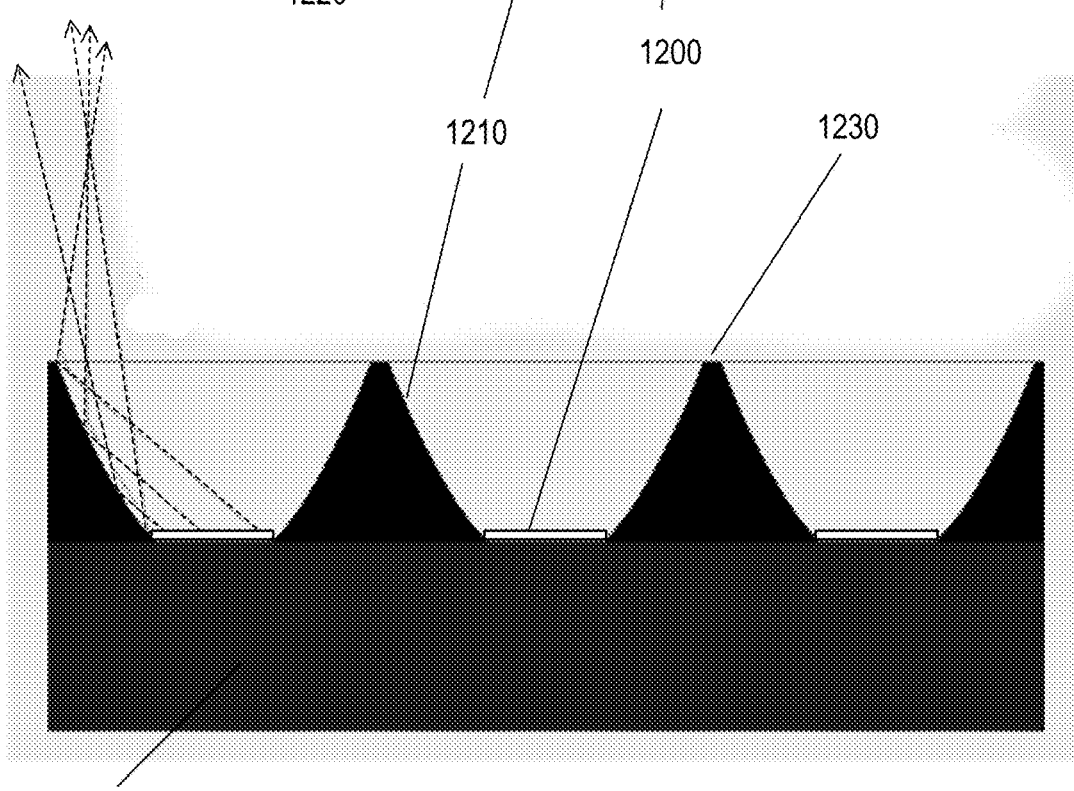

FIGS. 12A and 12B illustrate integrated LED reflectors for increased light collection in an LED projector, according to some embodiments. When forming LEDs 1200 on a LED structure 1220, reflectors 1210 may be epitaxially grown and/or etched into the silicon of the LED structure 1220. These reflectors 1210 act to collimate the light emitted from the LED 1200 die at the bottom of each reflector 1210 well. This may greatly ease the burden placed upon the lens design and may allow 100% or near 100% light collection. The projector lens may then be focused on the top output surface 1230 of the reflectors 1210 as opposed to the bottom die 1200 surface.

AR Light System Controller

Figure 13:
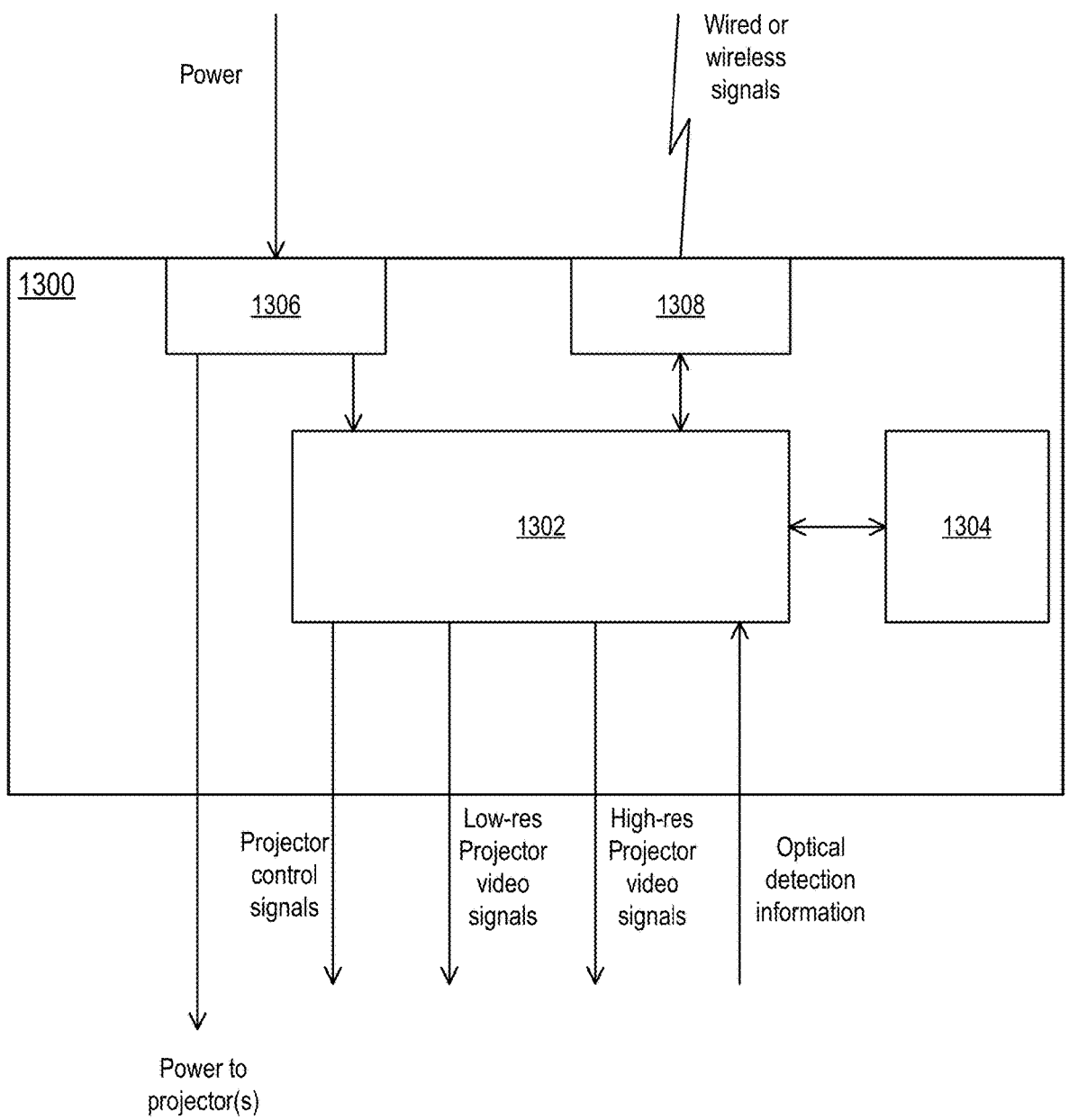
FIG. 13 is a block diagram illustrating components and functionality of an example controller for an AR light system as described herein, according to some embodiments.

FIG. 13 is a block diagram illustrating components and functionality of an example controller 1300 for an AR light system as described herein, according to some embodiments. In some embodiments, an AR light system as described herein may include a controller 1300 that may implement and control functionality of the AR light system. In some embodiments, the controller 1300 may include, but is not limited to, one or more processors 1302, memory 1304, power supply 1306 technology, and communications interface technology 1308.

In some embodiments, controller 1300 may generate or render video that may be projected by the high-resolution LED projector and/or by the low-resolution LED projector(s) (or by a foveated LED projector as illustrated in FIGS. 8A and 8B). In some embodiments, controller 1300 may also include memory 1304 that, for example, stores software that is executable by the controller 1300, data that may be used by the controller 1300, and/or that includes buffer(s) for video content. In some embodiments, controller 1300 may also include one or more interfaces 1308 (e.g., a Bluetooth technology interface, USB interface, etc.) that may facilitate communication with an external device via a wired or wireless connection. In some embodiments, the external device may send video to be rendered and displayed by the AR light system to the controller 1300 via interface 1308, and may also send signals to control operations of the AR light system 1300 to the controller 1300 via interface 1308. The external device may be or may include any type of computing system or computing device, such as a desktop computer, notebook or laptop computer, pad or tablet device, smartphone, hand-held computing device, game controller, game system, AR/VR device such as a head-mounted display device, and so on.

In some embodiments, controller 1300 may also process optical detection information as illustrated in FIG. 6. For example, controller 1300 may use the optical detection information in controlling operation of the low-resolution LED projector(s) and/or of the high-resolution LED projector. For example, upon detecting a person within the room, the controller may lower the intensity of the light projected towards that person by the low-resolution projector(s) to avoid "dazzling" the person with intense light. As another example, the controller may adjust focus of the low-resolution projector(s) via control signals to focus the projected imagery at different depths as detected by the optical detection system. Controller 1300 may also send control signals to the low- and/or high-resolution projector(s), for example signals to control switchable diffusers and/or actuators to move or focus the projector(s) as described herein.

In various embodiments, controller 1300 may be a uniprocessor system including one processor 1302, or a multiprocessor system including several processors 1302 (e.g., two, four, eight, or another suitable number). Controller 1300 may include central processing units (CPUs) that implement any suitable instruction set architecture, and may execute instructions defined in that instruction set architecture. For example, in various embodiments controller 1300 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 1300 may employ any microarchitecture, including scalar, superscalar, pipelined, superpipelined, out of order, in order, speculative, non-speculative, etc., or combinations thereof. Controller 1300 may include circuitry to implement microcoding techniques. Controller 1300 may include one or more processing cores that each execute instructions. Controller 1300 may include one or more levels of caches, which may employ any size and any configuration (set associative, direct mapped, etc.). In some embodiments, controller 1300 may include at least one graphics processing unit (GPU), which may include any suitable graphics processing circuitry. Generally, a GPU may render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 1300 may include one or more other components for processing and rendering video and/or images, for example image signal processors (ISPs), coder/decoders (codecs), etc.

Memory 1304 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Method of Operation for Low-Resolution LED Projectors

Figure 14:
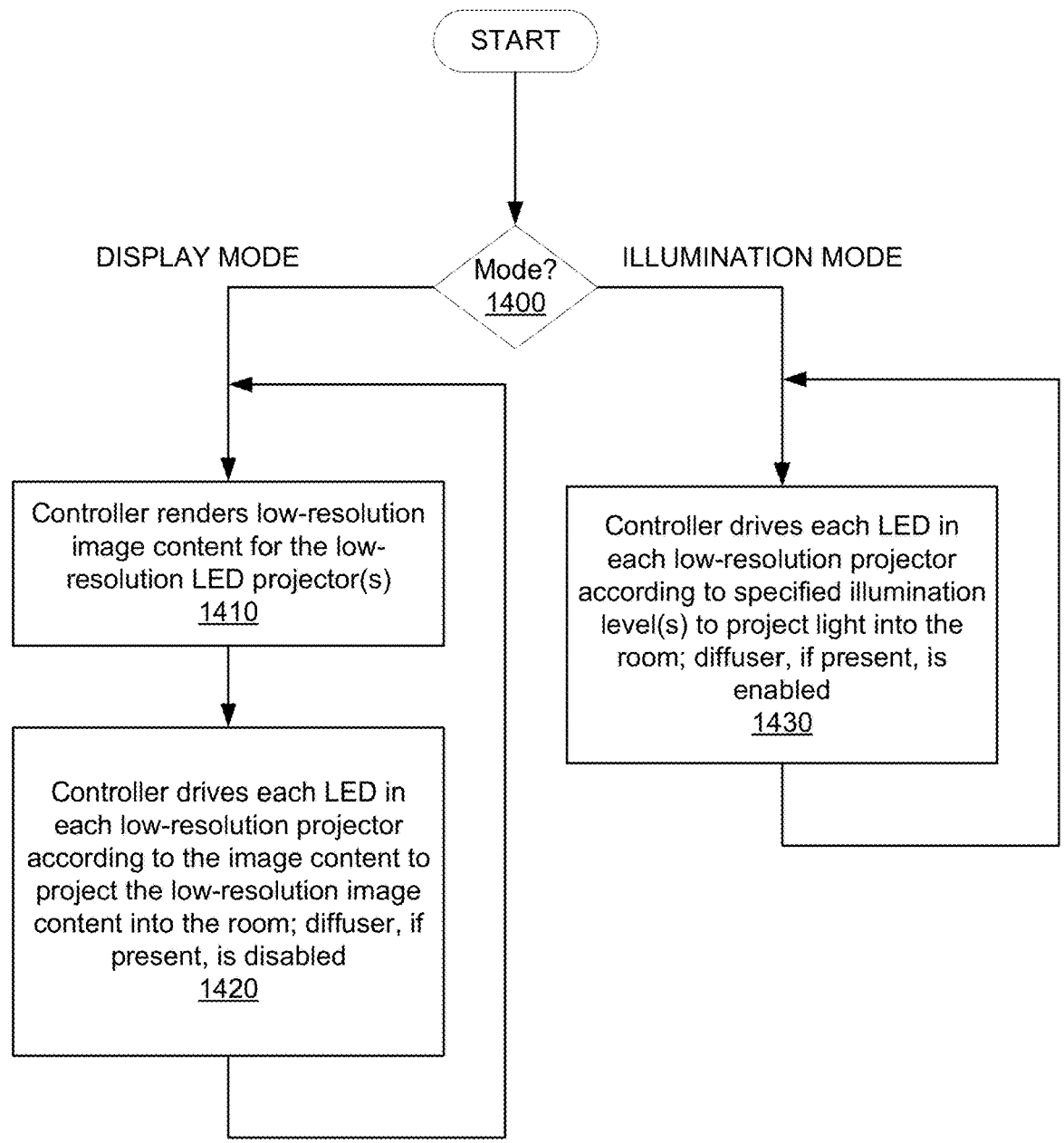
FIG. 14 is a flowchart of a method of operation for low-resolution LED projector(s) of an AR light system, according to some embodiments.

FIG. 14 is a flowchart of a method of operation for low-resolution LED projector(s) of an AR light system as illustrated in any of FIGS. 1A through 13, according to some embodiments. As indicated at 1400, a mode for the low-resolution LED projector(s) is determined. If the mode is display mode, then a controller of the AR light system renders low-resolution image content for the low-resolution LED projector(s), as indicated at 1410. As indicated at 1420, the controller drives each LED in each low-resolution projector according to the image content to project the low-resolution image content into the room. The diffuser mechanism, if present, is disabled. As indicated by the arrow returning to 1410, the display method continues as long as the AR light system is in display mode. At 1400, if the mode is illumination mode, then as indicated at 1430 the controller drives each LED in each low-resolution projector according to specified illumination level(s) to project light into the room. The diffuser mechanism, if present, is enabled. As indicated by the arrow returning to 1430, the illumination method continues as long as the AR light system is in illumination mode.

While not shown in FIG. 14, in some embodiments, the low-resolution projector(s) may include an integrated optical detection system to detect objects and surfaces (e.g., people and specular surfaces such as mirrors or windows) within a room. The optical detection system may also determine depth of objects or surfaces within a room. In some embodiments, the optical detection system may use infrared (IR) light to detect objects or surfaces. Information about objects and surfaces within a room collected by the optical detection systems may be fed back to the controller, which may use the information in controlling operation of the low-resolution LED projector(s). For example, upon detecting a person within the room, the controller may lower the intensity of the light projected towards that person by a low-resolution projector to avoid "dazzling" the person with intense light. As another example, the controller may adjust focus of the low-resolution projector via control signals to focus the projected imagery at different depths as detected by the optical detection system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Embodiments of the present disclosure can be described in view of the following clauses:

Clause 1. A light system, comprising:
a controller comprising one or more processors;
a first projector comprising:
an array of individually addressable light-emitting diodes (LEDs) configured to emit light representing virtual content under direction of the controller; and
a focusing lens configured to focus the light emitted by first array of LEDs on a surface in a room to form an image, wherein each LED in the array corresponds to a pixel in the image; and two or more additional projectors arranged around the first projector, each additional projector comprising:
  an array of individually addressable LEDs configured to emit light representing additional virtual content under direction of the controller; and
  a focusing lens configured to focus the light emitted by the respective array of LEDs on at least a portion of a surface in the room to form a respective image, wherein each LED in the respective array corresponds to a pixel in the respective image, and wherein resolution of the image formed by the additional projector is lower than resolution of the image formed by the first projector.

Clause 2. The light system as recited in clause 1, wherein the two or more additional projectors are further configured to emit light to provide illumination within the room when not emitting light representing the additional virtual content.

Clause 3. The light system as recited in clause 2, wherein each of the two or more additional projectors further comprises a diffuser mechanism configured to diffuse the light emitted by the respective array of LEDs to provide illumination within the room.

Clause 4. The light system as recited in clause 3, wherein the controller, the first projector, and two or more additional projectors are contained within a transparent or semi-transparent enclosure, and wherein at least one of the diffuser mechanisms of the two or more additional projectors is further configured to project image content onto the surface of the enclosure.

Clause 5. The light system as recited in clause 1, wherein the images formed on the surfaces of the room by the two or more additional projectors are grayscale images.

Clause 6. The light system as recited in clause 1, wherein at least one of the two or more additional projectors further comprises an integrated optical detection system configured to detect objects and surfaces within the room.

Clause 7. The light system as recited in clause 6, wherein the optical detection system is further configured to determine depth of the objects or surfaces within the room.

Clause 8. The light system as recited in clause 1, wherein the controller, the first projector, and the two or more additional projectors are contained within a transparent or semi-transparent enclosure.

Clause 9. The light system as recited in clause 8, wherein the light system further includes a passive heat dissipation mechanism.

Clause 10. The light system as recited in clause 9, wherein the passive heat dissipation mechanism includes heat sinks on each of the two or more additional projectors and air vents in the enclosure to allow passive thermal air flow through the light system.

Clause 11. The light system as recited in clause 1, further comprising wireless technology that enables wireless communications between the controller of the light system and other devices, wherein the virtual content is rendered from a video stream received from another device via the wireless connection.

Clause 12. The light system as recited in clause 11, wherein the other device is an augmented reality (AR) or virtual reality (VR) device being used by a person in the room to view virtual content, wherein the image formed by the first projector is a representation of the virtual content being viewed through the AR/VR device.

Clause 13. The light system as recited in clause 12, wherein the light system and the AR/VR device are configured to synchronize projection of the virtual content so that the person using the AR/VR device does not view the virtual content being projected by the light system.

Clause 14. A light system, comprising:
  a controller comprising one or more processors;
  a first projector comprising:
    an array of individually addressable light-emitting diodes (LEDs) configured to emit light representing virtual content under direction of the controller; and
    a narrow-angle focusing lens configured to focus the light emitted by the array of LEDs on a surface in a room to form an image, wherein each LED in the array corresponds to a pixel in the image; and
  a second projector located above the first projector, comprising:
    an array of individually addressable LEDs configured to emit light representing additional virtual content under direction of the controller; and
    a wide-angle focusing lens configured to focus the light emitted by the array of LEDs on at least a portion of surfaces in the room to form an image, wherein each LED in the array corresponds to a pixel in the image;
  wherein resolution of the image formed by the second projector is lower than resolution of the image formed by the first projector.

Clause 15. The light system as recited in clause 14, wherein the second projector is further configured to emit light to provide illumination within the room when not emitting light representing the additional virtual content.

Clause 16. The light system as recited in clause 15, wherein the second projector further comprises a diffuser mechanism configured to diffuse the light emitted by the respective array of LEDs to provide illumination within the room.

Clause 17. The light system as recited in clause 16, wherein the controller, the first projector, and the second projector are contained within a transparent or semi-transparent enclosure, and wherein the diffuser mechanism is further configured to project image content onto the surface of the enclosure.

Clause 18. The light system as recited in clause 14, wherein the image formed on the surfaces of the room by the second projector is a grayscale image.

Clause 19. The light system as recited in clause 14, wherein the second projector further comprises at least one integrated optical detection system configured to detect objects and surfaces within the room.

Clause 20. The light system as recited in clause 19, wherein the optical detection system is further configured to determine depth of the objects or surfaces within the room.

Clause 21. The light system as recited in clause 14, wherein the controller, the first projector, and the second projector are contained within a transparent or semi-transparent enclosure.

Clause 22. The light system as recited in clause 21, wherein the light system further includes a passive heat dissipation mechanism.

Clause 23. The light system as recited in clause 22, wherein the passive heat dissipation mechanism includes heat sinks on the first projector and the second projector and air vents in the enclosure to allow passive thermal air flow through the light system.

Clause 24. The light system as recited in clause 14, further comprising wireless technology that enables wireless communications between the controller of the light system and other devices, wherein the virtual content is rendered from a video stream received from another device via the wireless connection.

Clause 25. The light system as recited in clause 24, wherein the other device is an augmented reality (AR) or virtual reality (VR) device being used by a person in the room to view virtual content, wherein the image formed by the first projector is a representation of the virtual content being viewed through the AR/VR device.

Clause 26. The light system as recited in clause 25, wherein the light system and the AR/VR device are configured to synchronize projection of the virtual content so that the person using the AR/VR device does not view the virtual content being projected by the light system.

Clause 27. A light system, comprising:
a controller comprising one or more processors;
a foveated projector, comprising:
   a foveated array of individually addressable light-emitting diodes (LEDs) configured to emit light under direction of the controller, wherein the foveated array of LEDs includes a central array of addressable LEDs for emitting light representing virtual content surrounded by addressable LEDs for emitting light representing additional virtual content; and
   a wide-angle focusing lens configured to focus the light emitted by the foveated array of LEDs on surfaces in a room to form a first image from the light emitted by the central array of LEDs and to form additional images from the light emitted by the addressable LEDs surrounding the central array, wherein each LED in the central array of LEDs corresponds to a pixel in the first image, and wherein each LED surrounding the central array corresponds to a pixel in the additional images;
wherein resolution of the first image formed from the light emitted by the central array of LEDs is higher than resolution of the images formed from the light emitted by the addressable LEDs surrounding the central array.

Clause 29. The light system as recited in clause 27, wherein the foveated projector is further configured to emit light to provide illumination within the room when not emitting light representing virtual content.

Clause 30. The light system as recited in clause 28, wherein the foveated projector further comprises a diffuser mechanism configured to diffuse the light emitted by the foveated array of LEDs to provide illumination within the room.

Clause 31. The light system as recited in clause 29, wherein the controller and the foveated projector are contained within a transparent or semi-transparent enclosure, and wherein the diffuser mechanism is further configured to project image content onto the surface of the enclosure.

Clause 32. The light system as recited in clause 27, wherein the images formed on the surfaces of the room from the light emitted by the addressable LEDs surrounding the central array are grayscale images.

Clause 33. The light system as recited in clause 27, further comprising at least one optical detection system configured to detect objects and surfaces within the room.

Clause 34. The light system as recited in clause 33, wherein the optical detection system is further configured to determine depth of the objects or surfaces within the room.

Clause 35. The light system as recited in clause 27, wherein the controller and the foveated projector are contained within a transparent or semi-transparent enclosure.

Clause 36. The light system as recited in clause 35, wherein the light system further includes a passive heat dissipation mechanism.

Clause 37. The light system as recited in clause 36, wherein the passive heat dissipation mechanism includes a heat sink on the foveated projector and air vents in the enclosure to allow passive thermal air flow through the light system.

Clause 38. The light system as recited in clause 27, further comprising wireless technology that enables wireless communications between the controller of the light system and other devices, wherein the virtual content is rendered from a video stream received from another device via the wireless connection.

Clause 39. The light system as recited in clause 38, wherein the other device is an augmented reality (AR) or virtual reality (VR) device being used by a person in the room to view virtual content, wherein the first image formed from the light emitted by the central array of LEDs is a representation of the virtual content being viewed through the AR/VR device.

Clause 40. The light system as recited in clause 39, wherein the light system and the AR/VR device are configured to synchronize projection of the virtual content so that the person using the AR/VR device does not view the virtual content being projected by the light system.

Clause 41. A projector, comprising:
an array of individually addressable light-emitting diodes (LEDs) configured to emit light representing virtual content under direction of a controller; and
a focusing lens configured to focus the light emitted by the array of LEDs on a surface to form an image on the surface, wherein each LED in the array corresponds to a pixel in the image.

Clause 42. The projector as recited in clause 41, wherein the array of LEDs is further configured to emit light to provide illumination within a room when not emitting light representing the virtual content.

Clause 43. The projector as recited in clause 42, further comprising a diffuser mechanism configured to diffuse the light emitted by the array of LEDs to provide illumination within the room.

Clause 44. The projector as recited in clause 41, wherein the image formed on the surface is a grayscale image.

Clause 45. The projector as recited in clause 41, further comprising an integrated optical detection system configured to detect objects and surfaces within a room.

Clause 46. The projector as recited in clause 45, wherein the optical detection system is further configured to determine depth of the objects or surfaces within the room.

Clause 47. The projector as recited in clause 41, wherein the focusing lens includes an injection molded optical plastic lens.

What is claimed is:
1. A light system, comprising:
a controller comprising one or more processors;
a first projector comprising:
   an array of individually addressable light-emitting diodes (LEDs) configured to emit light representing virtual content under direction of the controller; and
   a focusing lens configured to focus the light emitted by the array of LEDs on a surface in a room to form an image, wherein individual LEDs in the array corresponds to individual pixels in the image; and
two or more additional projectors arranged around the first projector, each additional projector comprising:
   an additional array of individually addressable LEDs configured to emit light representing additional virtual content under direction of the controller; and an additional focusing lens configured to focus the light emitted by the respective additional array of LEDs on at least a portion of a surface in the room to form a respective image, wherein individual LEDs in the respective additional array corresponds to individual pixels in the respective image, and wherein resolution of the respective image formed by the additional projectors is lower than resolution of the image formed by the first projector; and a diffuser mechanism configured to control a presence of inter-pixel gaps in light emitted by the light system and switch the light system among at least two modes, including (a) a display mode wherein the light system emits light representing image content and (b) an illumination mode wherein the light system emits light to illuminate the room when not emitting light that represents the image content, wherein the inter-pixel gaps are not present in the light emitted under the illumination mode.

2. The light system as recited in claim 1, wherein the diffuser mechanism includes a diffuser located between the array of LEDs of the first projector and the focusing lens of the first projector.

3. The light system as recited in claim 1, wherein the controller is configured to enable and disable the diffuser mechanism.

4. The light system as recited in claim 1, wherein the controller, the first projector, and two or more additional projectors are contained within a transparent or semi-transparent enclosure, and wherein the diffuser mechanism is further configured to project image content onto the surface of the enclosure.

5. The light system as recited in claim 1, wherein the images formed on the surfaces of the room by the two or more additional projectors are grayscale images.

6. The light system as recited in claim 1, wherein at least one of the two or more additional projectors further comprises an integrated optical detection system configured to detect objects and surfaces within the room.

7. The light system as recited in claim 6, wherein the optical detection system is further configured to determine depth of the objects or surfaces within the room.

8. The light system as recited in claim 1, wherein the controller, the first projector, and the two or more additional projectors are contained within a transparent or semi-transparent enclosure.

9. The light system as recited in claim 1, wherein the light system further includes a passive heat dissipation mechanism.

10. The light system as recited in claim 9, wherein the passive heat dissipation mechanism includes heat sinks on each of the two or more additional projectors and air vents in the enclosure to allow passive thermal air flow through the light system.

11. The light system as recited in claim 1, further comprising a wireless communication component that enables wireless communication between the controller of the light system and other devices, wherein the virtual content is rendered from a video stream received from another device via the wireless communication.

12. The light system as recited in claim 11, wherein the other device is an augmented reality (AR) or virtual reality (VR) device being used by a person in the room to view virtual content, wherein the image formed by the first projector is a representation of the virtual content being viewed through the AR/VR device.

13. The light system as recited in claim 12, wherein the light system and the AR/VR device are configured to synchronize projection of the virtual content so that the person using the AR/VR device does not view the virtual content being projected by the light system.

14. A light system, comprising:
a controller comprising one or more processors;
a first projector comprising:
a first array of individually addressable light-emitting diodes (LEDs) configured to emits light representing virtual content under direction of the controller; and
a narrow-angle focusing lens configured to focus the light emitted by the first array of LEDs on a surface in a room to form an image, wherein individual LEDs in the first array corresponds to individual pixels in the image; and
a second projector located above the first projector, comprising:
a second array of individually addressable LEDs configured to emits light representing additional virtual content under direction of the controller; and
a wide-angle focusing lens configured to focus the light emitted by the second array of LEDs on at least a portion of surfaces in the room to form an image, wherein individual LEDs in the second array corresponds to individual pixels in the image, wherein resolution of the image formed by the second projector is lower than resolution of the image formed by the first projector; and
a diffuser mechanism configured to control a presence of inter-pixel gaps in light emitted by the light system and switch the light system among at least two modes, including (a) a display mode wherein the light system emits light representing image content and (b) an illumination mode wherein the light system emits light to illuminate the room when not emitting light that represents the image content, wherein the inter-pixel gaps are not present in the light emitted under the illumination mode.

15. The light system as recited in claim 14, wherein the diffuser mechanism includes a diffuser located between the first array of LEDs of the first projector and the narrow-angle focusing lens of the first projector.

16. The light system as recited in claim 14, wherein the controller is configured to enable and disable the diffuser mechanism.

17. The light system as recited in claim 14, wherein the controller, the first projector, and the low-resolution second projector are contained within a transparent or semi-transparent enclosure, and wherein the diffuser mechanism is further configured to project image content onto the surface of the enclosure.

18. The light system as recited in claim 14, wherein the image formed on the surfaces of the room by the second projector is a grayscale image.

19. The light system as recited in claim 14, wherein the second projector further comprises at least one integrated optical detection system configured to detect objects and surfaces within the room.

20. A light system, comprising:
a controller comprising one or more processors;
a foveated projector, comprising:
a foveated array of individually addressable light-emitting diodes (LEDs) configured to emit light under direction of the controller, wherein the foveated array of LEDs includes a central array of addressable LEDs for emitting light representing virtual content surrounded by addressable LEDs for emitting light representing additional virtual content; and a wide-angle focusing lens configured to focus the light emitted by the foveated array of LEDs on surfaces in a room to form a first image from the light emitted by the central array of LEDs and to form additional images from the light emitted by the addressable LEDs surrounding the central array, wherein individual LEDs in the central array of LEDs corresponds to individual pixels in the first image, wherein individual LEDs surrounding the central array corresponds to individual pixels in the additional images, and wherein resolution of the first image formed from the light emitted by the central array of LEDs is higher than resolution of the images formed from the light emitted by the addressable LEDs surrounding the central array; and a diffuser mechanism configured to control a presence of inter-pixel gaps in light emitted by the light system and switch the light system among at least two modes, including (a) a display mode wherein the light system emits light representing image content and (b) an illumination mode wherein the light system emits light to illuminate the room when not emitting light that represents the image content, wherein the inter-pixel caps are not present in the light emitted under the illumination mode.

* * * * *